United States Patent [19]
Hellesøe

[11] Patent Number: 6,017,065
[45] Date of Patent: Jan. 25, 2000

[54] REMOTELY OPERABLE UNDERWATER CONNECTOR ASSEMBLY AND METHOD

[76] Inventor: Bernt H. Hellesøe, 100 E. Nasa Rd. 1, Suite 410, Webster, Tex. 77598

[21] Appl. No.: 09/210,968

[22] Filed: Dec. 14, 1998

Related U.S. Application Data

[60] Provisional application No. 60/069,601, Dec. 15, 1997.

[51] Int. Cl.⁷ .................................................. B60D 1/26
[52] U.S. Cl. ......................... 285/25; 285/124.2; 285/920
[58] Field of Search ................................ 285/24, 25, 28, 285/36, 120.1, 124.1, 124.3, 124.4, 124.5, 920, FOR 118; 405/190, 191; 166/366; 254/98

[56] References Cited

U.S. PATENT DOCUMENTS

| | | | |
|---|---|---|---|
| 391,789 | 10/1888 | Grant | 285/25 |
| 3,830,468 | 8/1974 | Whitchurch | 254/98 X |
| 4,191,256 | 3/1980 | Croy et al. | 285/920 X |
| 4,364,433 | 12/1982 | Fisher et al. | |
| 4,489,959 | 12/1984 | Satterwhite | |
| 4,915,419 | 4/1990 | Smith, III | |
| 5,501,549 | 3/1996 | Breda et al. | |
| 5,834,721 | 11/1998 | Østergaard et al. | |

*Primary Examiner*—Lynne H. Browne
*Assistant Examiner*—Greg Binda
*Attorney, Agent, or Firm*—Keeling Law Firm

[57] ABSTRACT

My invention comprises a male assembly, including a plurality of male connectors in functional communication with a first set of electric/hydraulic lines, a female assembly, including a plurality of female connectors in functional communication with a second set of electric/hydraulic lines, a means for vertically aligning, and a means for horizontally aligning. Male assembly is fixed in the appropriate underwater location, and female assembly is transported, normally by an ROV, to such underwater location. Female assembly is then positioned into a properly aligned position in relation to male assembly in preparation for their coupling. Means for vertically aligning first ensures that male and female connecting elements are properly aligned in the vertical direction during their coupling. Thereafter, means for horizontally aligning ensures that male and female connecting elements are properly aligned in the horizontal direction during their coupling. Once vertical and horizontal alignment means have properly aligned the assemblies, means for functionally engaging couples the female connecting elements to the male connecting elements.

20 Claims, 9 Drawing Sheets

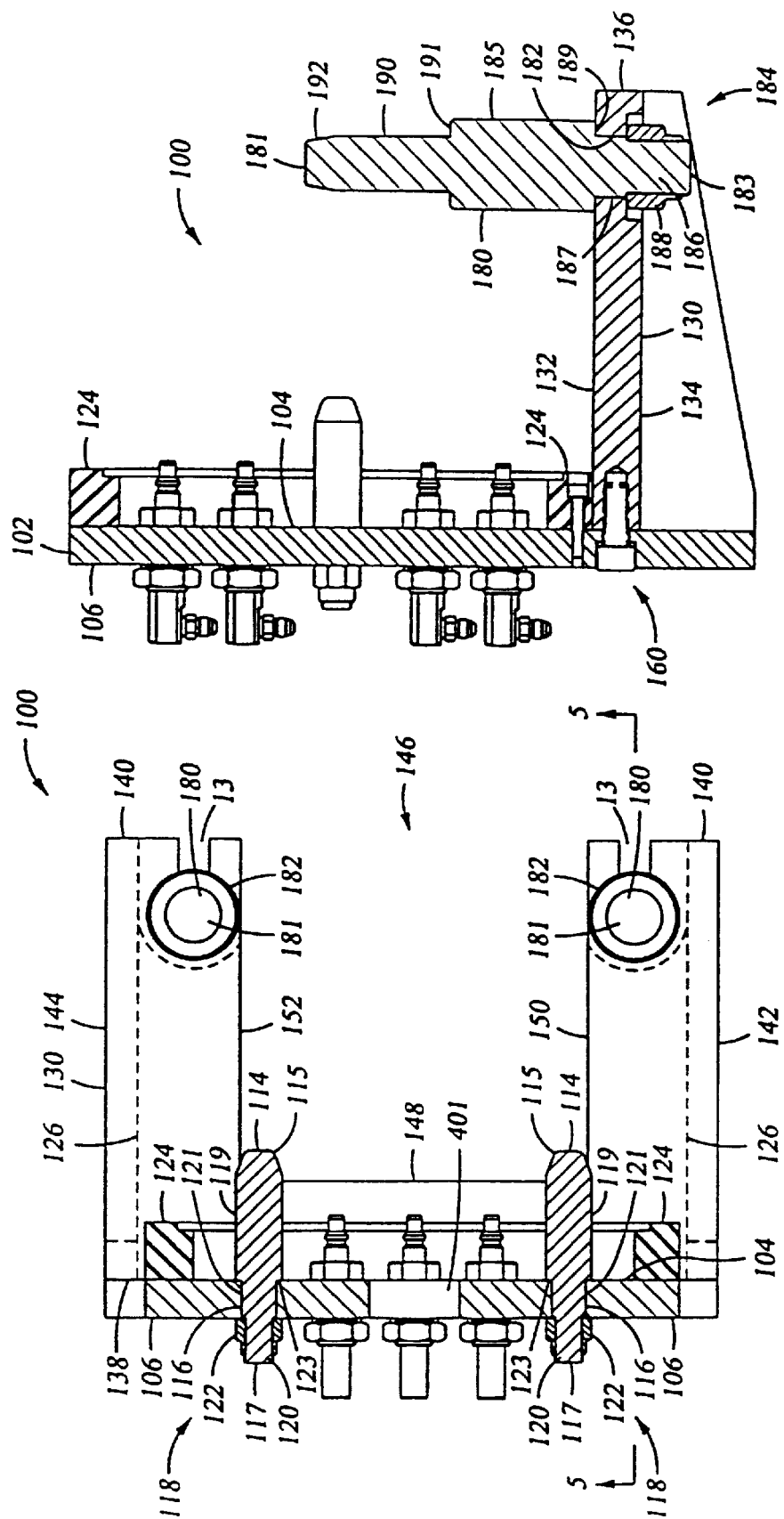

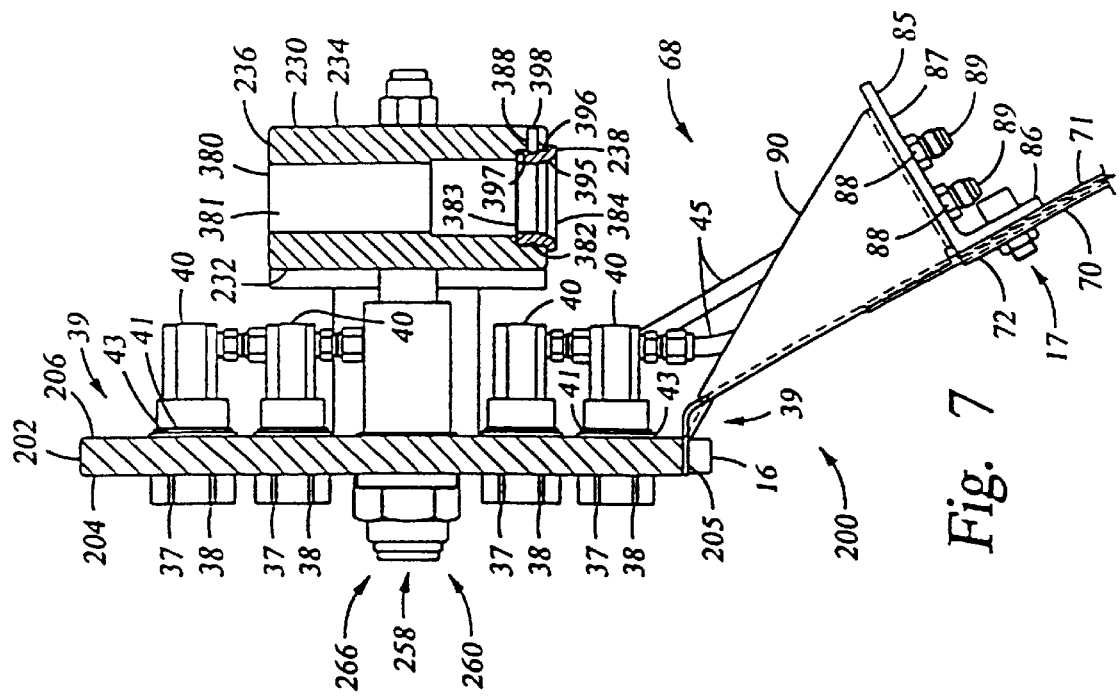
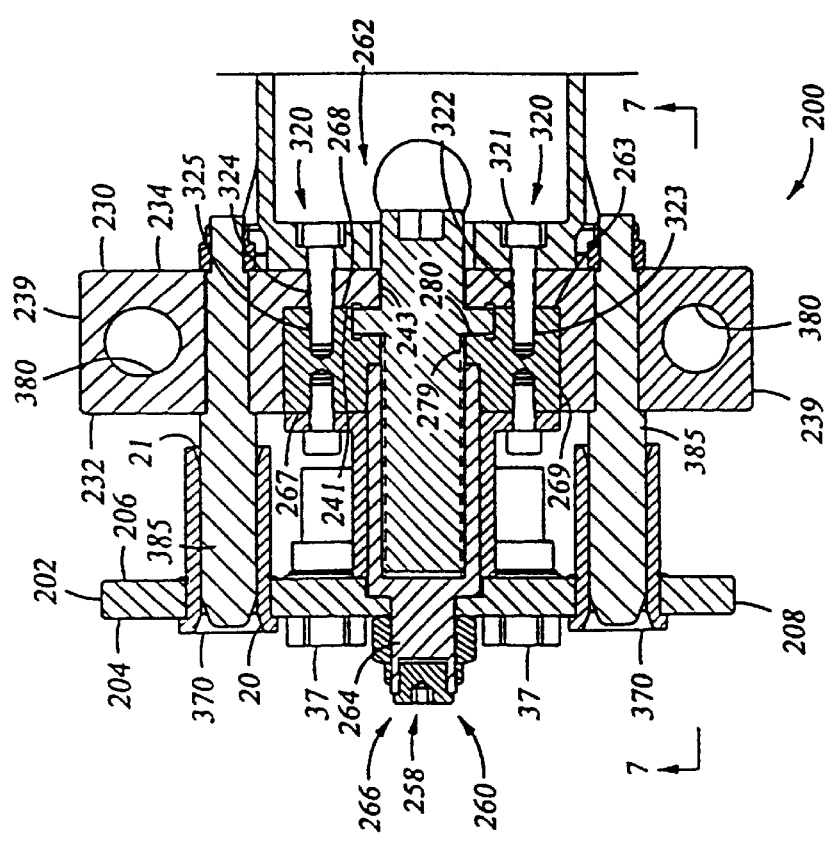

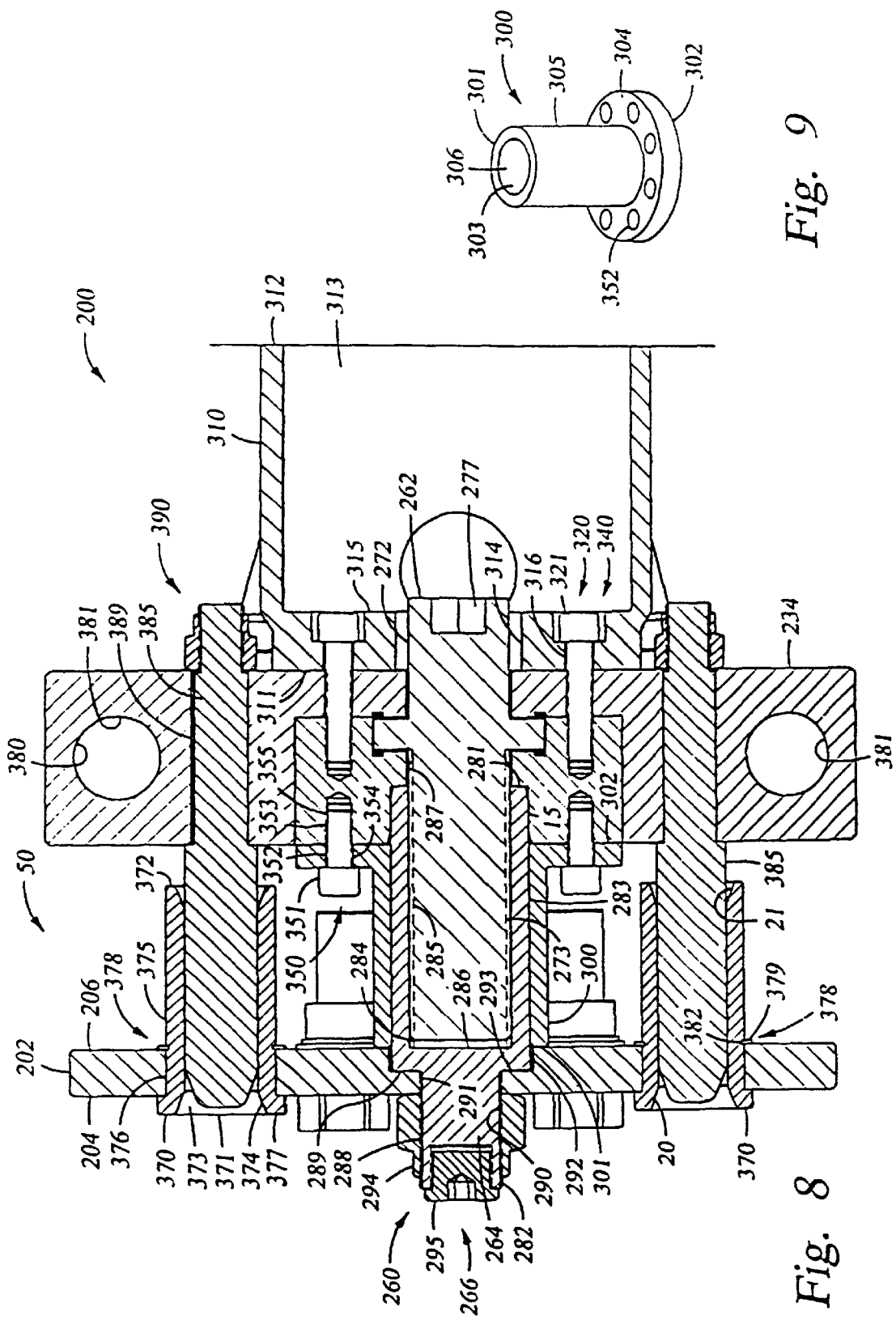

REMOTELY OPERABLE UNDERWATER CONNECTOR ASSEMBLY AND METHOD

This application claims the benefit of U.S. Provisional Patent Application No. 60/069,601 filed by Hellesoe on Dec. 15, 1997.

BACKGROUND OF THE INVENTION

1. Field of Invention

This invention relates generally to underwater connectors, hydraulic and/or electric. More specifically, this invention is directed to an underwater quick connector assembly capable of being operated by either a remotely operated vehicle (ROV), a mini submarine, a manipulator, or a remotely operated tool. The underwater quick connector assembly utilizes means for vertically aligning, means for horizontally aligning, and a functional engagement means to ensure a safe and proper connection of its associated male and female connecting elements.

Underwater quick connector systems, their operation, and their docking systems have in the past been fraught with problems. Not only is the quick-connector system equipment exceedingly expensive, but the time and money devoted to each underwater connection attempt is also substantial. Every equipment failure and every unsuccessful underwater connection attempt costs an operator large quantities of time and money. Thus, it would be beneficial to provide an underwater quick connector method and system which decreases instances of such failures.

In the typical underwater quick connector system, the actual male and female connecting elements are very delicate and may be damaged in many ways, including hitting the connecting elements against a hard surface or jamming the male and female connecting elements together when each is not properly aligned. These possibilities of damage are greatly enhanced in the deep-sea underwater environment where a remotely operated vehicle or tool ("ROV"), instead of a human being, must normally be used to couple the male and female connecting elements. Although ROVs may be maneuvered or steered to a certain extent, ROVs normally do not provide the stability of position nor the degree of precision in movement necessary to ensure a safe and proper coupling of the male and female connecting elements. It would thus be beneficial to provide an underwater quick connector system which operates in a way that makes the problems relating to the use of ROVs inconsequential.

Furthermore, underwater quick connector systems generally include a fixed underwater mounted unit, which is not movable to the ocean surface, as well as a retrievable unit, which is transported from the ocean surface to the fixed underwater mounted unit and is mated therewith. If any movable or operable parts are included in the fixed underwater mounted unit, then such parts are subject to the underwater environment and may not be retrieved to the ocean surface. Subjecting movable or operable parts prior to their activation to the harsh underwater environment for a substantial amount of time may hinder such parts inoperable. In addition, if any of such parts are damaged for some reason, then repairing the damaged parts is extremely difficult since they are attached to the fixed underwater mounted unit and may not be easily retrieved. It would thus be beneficial to provide an underwater quick connector system which allows for the easy retrieval of all operable and movable parts.

2. Related Art

As previously stated, prior art underwater quick connector systems generally comprise a fixed underwater mounted unit, which is not movable to the ocean surface, as well as a retrievable unit, which is transported from the ocean surface to the fixed underwater mounted unit and is mated therewith. Illustrative of such prior art systems are U.S. Pat. No. 4,915,419 issued to Smith, III on Apr. 10, 1990 and U.S. Pat. No. 5,834,721 issued to Ostergaard et al. on Nov. 10, 1998. Applicant is not aware of any prior art system which utilizes means for horizontally aligning, means for vertically aligning, and a functional engagement means to ensure the proper and safe coupling of the two units.

SUMMARY OF THE INVENTION

Accordingly, the objectives of this invention are to provide, inter alia, a remotely operable connector assembly that:

utilizes vertical and horizontal alignment means to ensure the proper and safe coupling of the male and female connectors;

makes the inherent instability and imprecision problems relating to the use of ROVs inconsequential;

reduces the occurrences of equipment and/or connection at tempt failures; and allows for the easy retrieval of all operable and movable parts of the system.

Other objects of the invention will become apparent from time to time throughout the specification hereinafter disclosed.

To achieve such objectives, my invention comprises a male assembly, including a plurality of male connectors in functional communication with a first set of electric/hydraulic lines, a female assembly, including a plurality of female connectors in functional communication with a second set of electric/hydraulic lines, a means for vertically aligning, and a means for horizontally aligning. Male assembly is fixed in the appropriate underwater location, and female assembly is transported, normally by an ROV, to such underwater location. Female assembly is then positioned into a properly aligned position in relation to male assembly in preparation for their coupling. Means for vertically aligning first ensures that male and female connecting elements are properly aligned in the vertical direction during their coupling. Thereafter, means for horizontally aligning ensures that male and female connecting elements are properly aligned in the horizontal direction during their coupling. Once vertical and horizontal alignment means have properly aligned the assemblies, means for functionally engaging couples the female connecting elements to the male connecting elements.

BRIEF DESCRIPTION OF THE DRAWINGS

FIG. 4 is a cross-sectional view of the male assembly taken along line 2—2 of FIG. 1, not including the female assembly.

FIG. 5 is a cross-sectional view of the male assembly taken along line 5—5 of FIG. 4. Relevant fasteners and bolts are not shown as cross-sections for purposes of clarity.

FIG. 6 is a cross-sectional view of the female assembly taken along line 2—2 of FIG. 1, not including the male assembly. Relevant fasteners and bolts are not shown as cross-sections for purposes of clarity.

FIG. 7 is a cross-sectional view of the female assembly taken along line 7—7 of FIG. 6.

FIG. 8 is a cross-sectional view of the female assembly taken along line 2—2 of FIG. 1, not including the male assembly. Relevant fasteners and bolts are not shown as cross-sections for purposes of clarity.

FIG. 9 is an isometric view of a spacer.

DETAILED DESCRIPTION OF THE INVENTION

Figure 1:
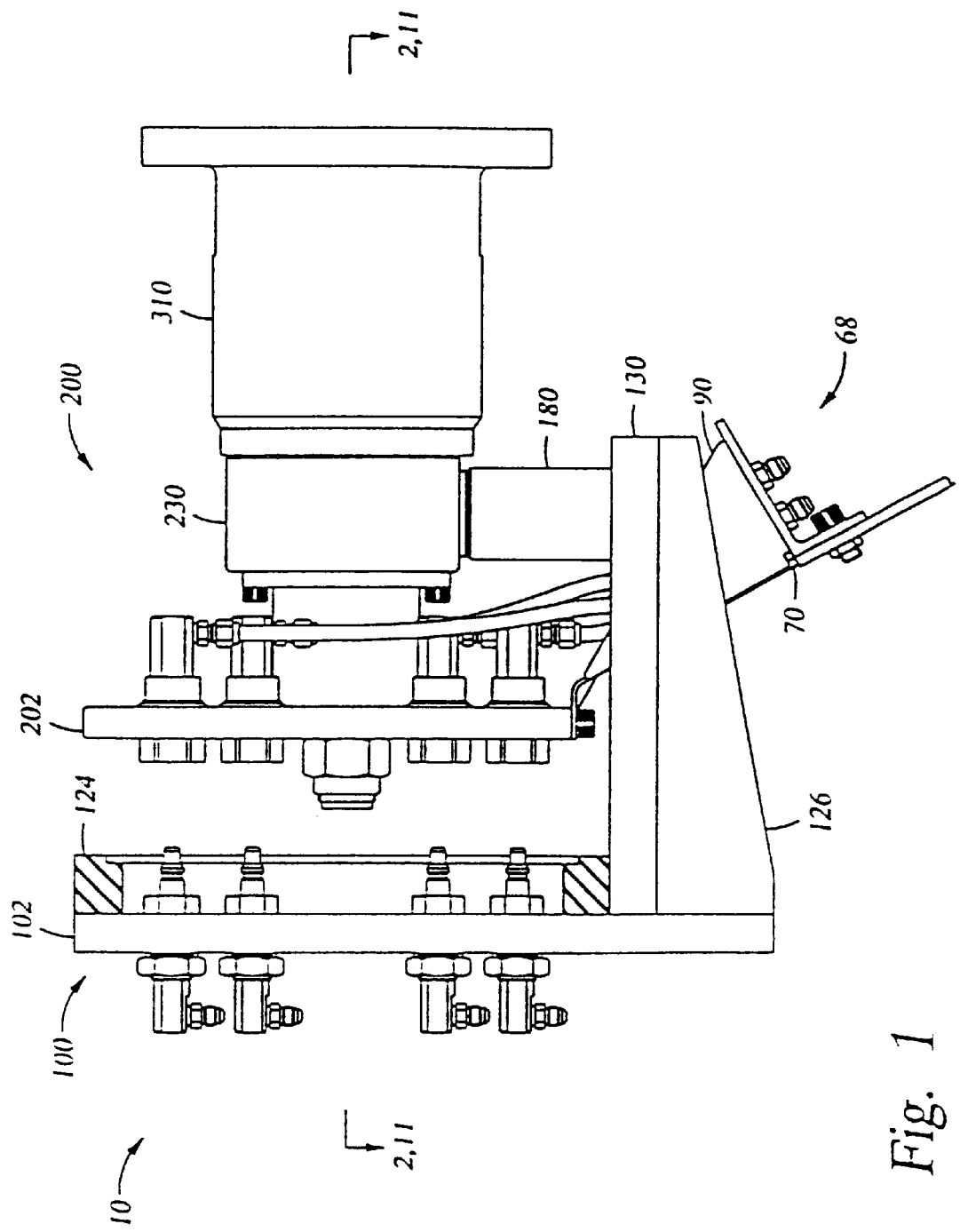
FIG. 1 is an elevational view of the female assembly resting on the male assembly, not including means for horizontally aligning, in the retracted position.

The Remotely Operable Underwater Connector Assembly is generally depicted as 10 and is shown in FIGS. 1–12. The system 10 generally comprises a male assembly 100, a female assembly 200, a means for vertically aligning 400 (see FIG. 2), a means for horizontally aligning 500 (see FIG. 3), and a means for functionally engaging 258 (see FIGS. 6 and 7). Male assembly 100 couples with female assembly 200. Means for vertically aligning 400 and means for horizontally aligning 500 ensure that male assembly 100 and female assembly 200 are correctly aligned, relative to each other, in order to provide a proper connection. Means for functionally engaging 258 ensures the functional coupling of male and female assemblies, 100 and 200.

It is preferred that all parts of system 10 be constructed of a durable, rigid material capable of withstanding the harsh underwater environment and having anti-corrosion characteristics, such as stainless steel. Such parts of system 10 may also be at least partially constructed from a polymer material, which reduces the weight of system 10 and makes system 10 at least partially floatable.

As best seen in FIGS. 2–5, male assembly 100 generally comprises a male plate 102 and a support plate 130. Male plate 102 comprises a male plate first surface 104, a male plate second surface 106, and a width 108. Preferably, male plate first surface 104 is substantially parallel to male plate second surface 106 thereby ensuring that width 108 is uniform along the entire configuration and shape of male plate 102. Preferably, male plate 102 is rectangular in shape.

Figure 10:
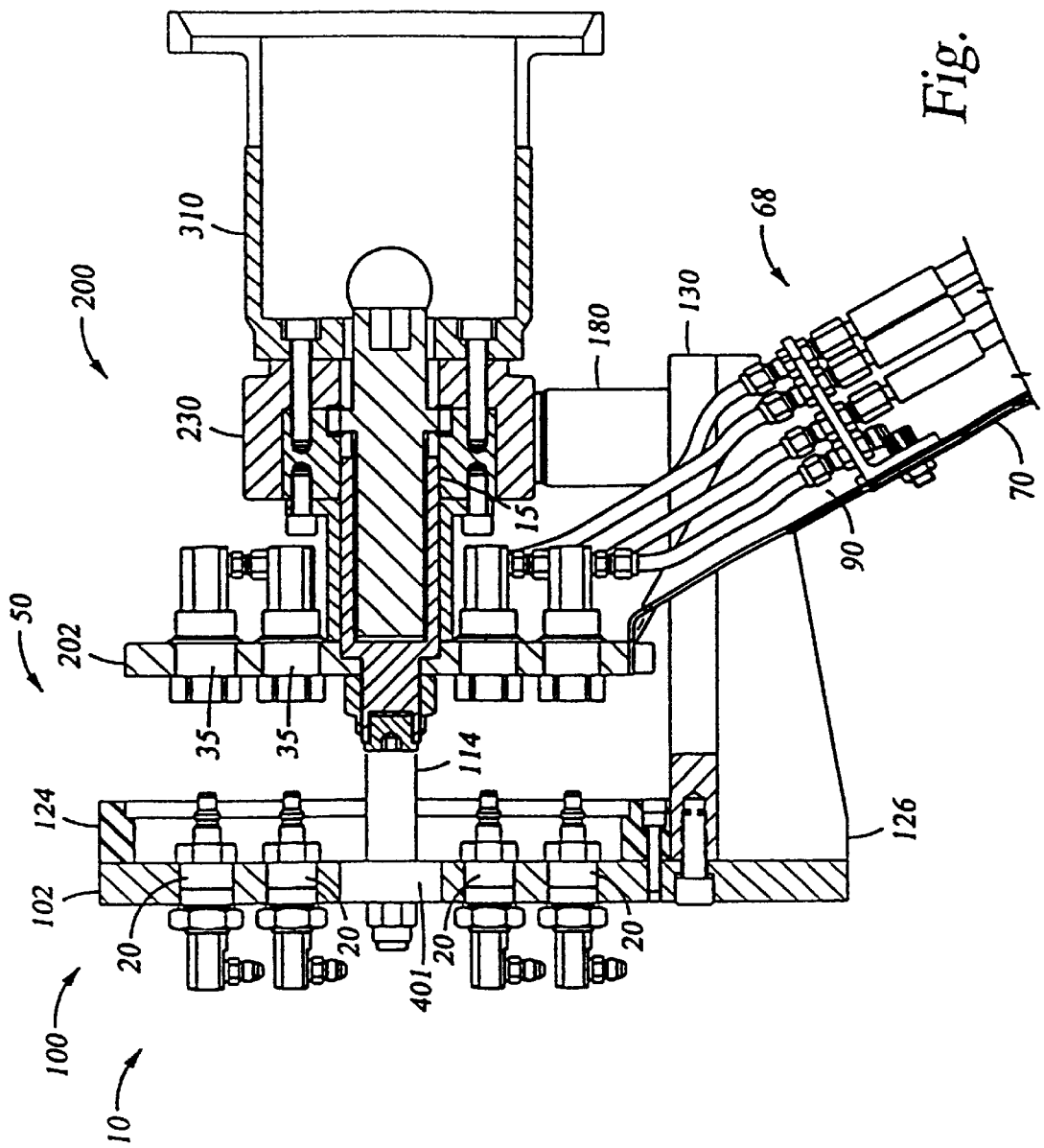
FIG. 10 is a cross-sectional view of the female assembly resting on the male assembly in the retracted position taken along line 10—10 of FIG. 2. Relevant fasteners, bolts, male connecting elements, and female connecting elements are not shown as cross-sections for purposes of clarity.
Figure 11:
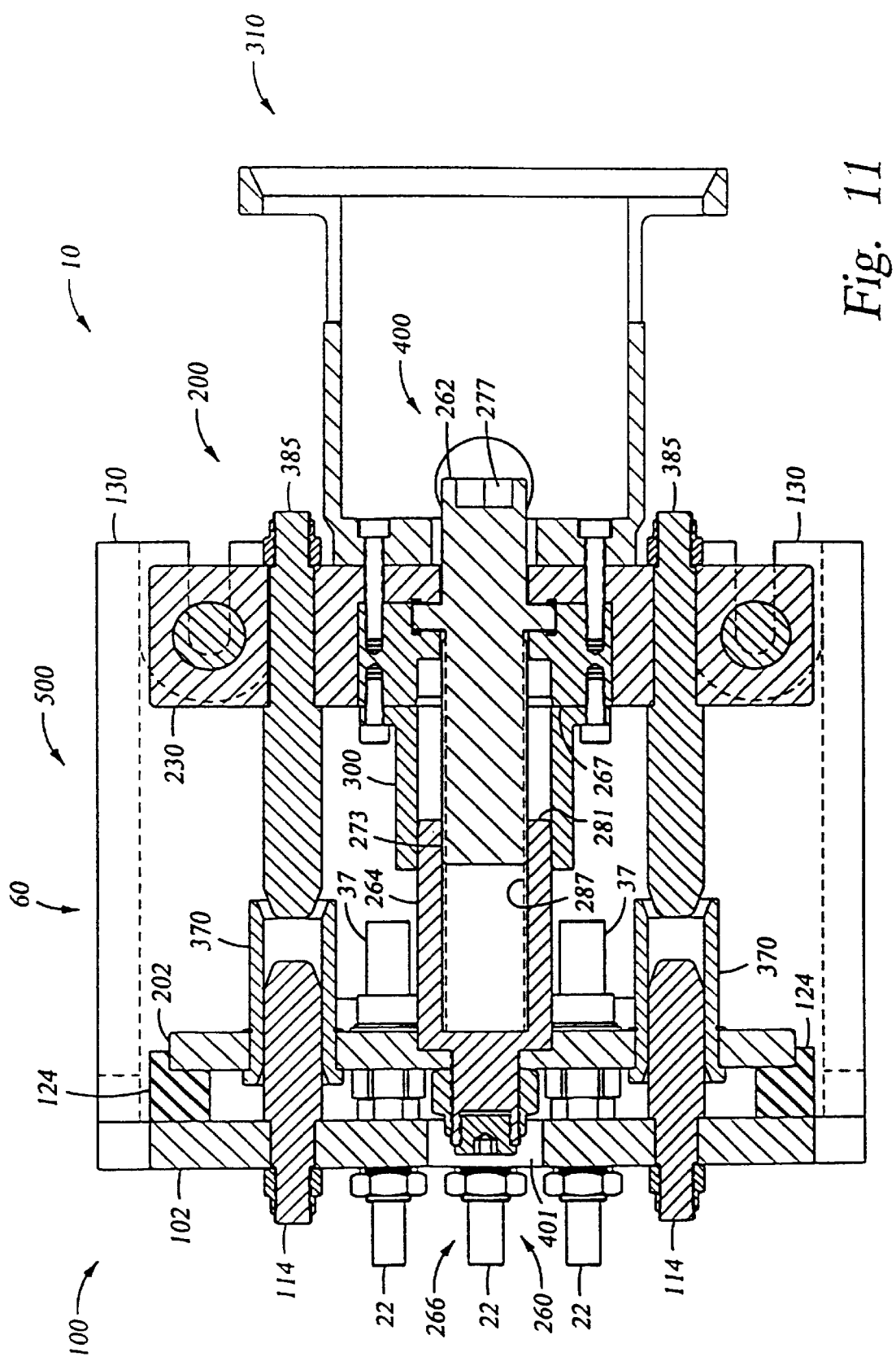
FIG. 11 is a cross-sectional view of the female assembly resting on the male assembly in the extended position taken along line 11—11 of FIG. 1. Relevant fasteners and bolts are not shown as cross-sections for purposes of clarity.
Figure 12:
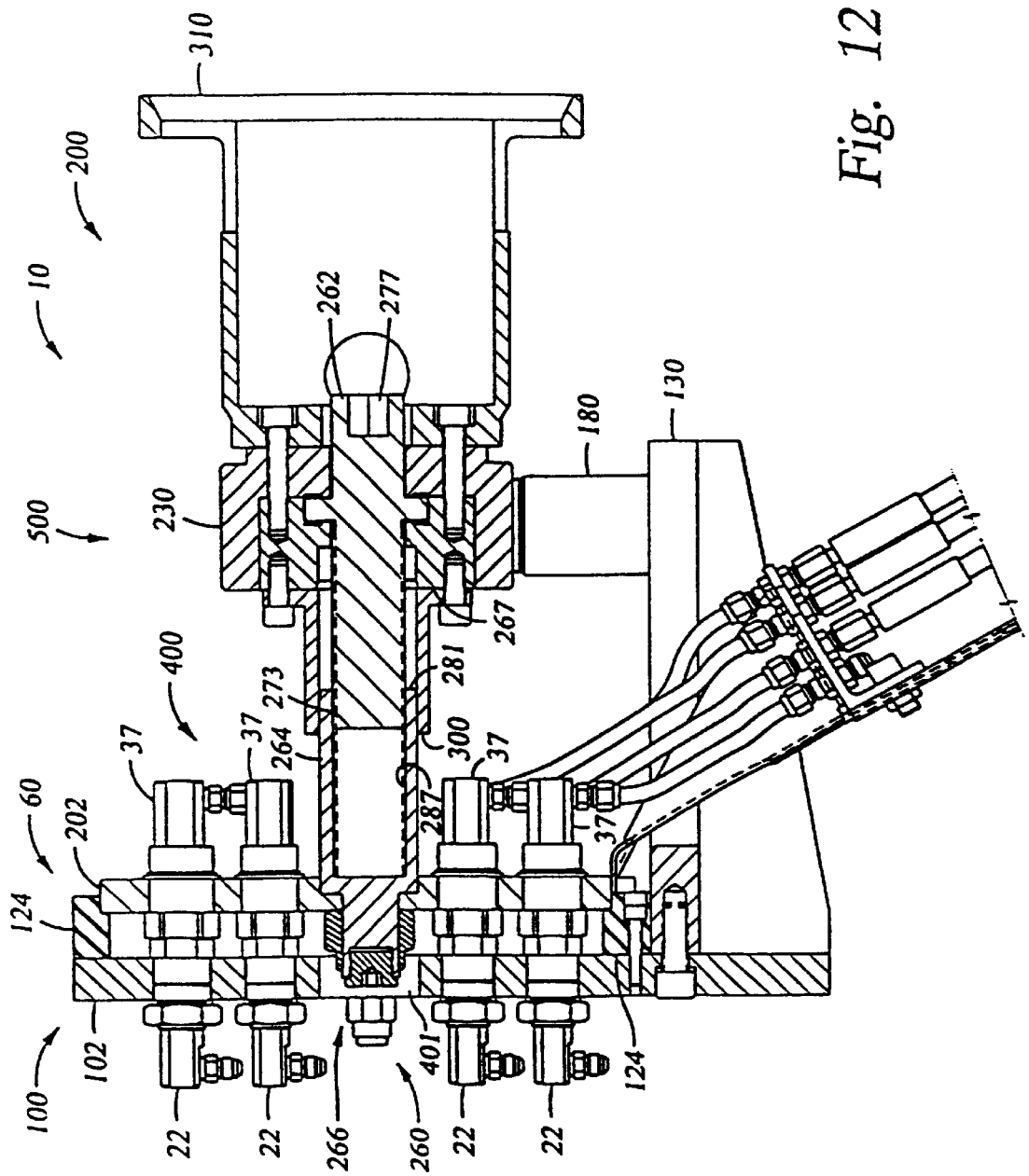
FIG. 12 is a cross-sectional view of the female assembly resting on the male assembly in the extended position taken along line 12—12 of FIG. 2. Relevant fasteners, bolts, male connecting elements, and female connecting elements are not shown as cross-sections for purposes of clarity.

Male plate 102 includes a plurality of male plate openings 20, as best shown in FIGS. 10 and 12. Each male plate opening 20 extends from male plate first surface 104 towards and through male plate second surface 106.

A male connecting element 22, well-known in the art, is disposed within each male plate opening 20 so that its engagement end 23 protrudes from male plate first surface 104 and so that its equipment attachment end 25 protrudes from male plate second surface 106. Male connecting element 22 may comprise a hydraulic or an electric male connecting element. Means for attaching male connecting element 24 attaches the equipment attachment end 25 of each male connecting element 22 to the male plate 102 by commonly known structures, such as a hex nut 26 and spacer ring 28. At equipment attachment end 25, each male connecting element 22 is in functional communication, by way of tubing, to a first set of lines, which, in turn, are in communication with other machines or equipment.

The plurality of male plate openings 20 are preferably arranged in a pattern on male plate 102. Preferably, the plurality of male plate openings 20 are arranged in a pattern of rows and columns. In one preferred embodiment (not specifically shown in the Figures), plurality of male plate openings comprises eighteen male plate openings 20. The eighteen male plate openings 20 are arranged in four rows with five male plate openings 20 in the first and fourth rows and four male plate openings 20 in the second and third rows. In the preferred embodiment, one male plate opening 20 of each of the second and third rows is arranged between columns 1 and 2, one between columns 2 and 3, one between columns 3 and 4, and one between columns 4 and 5 of the first and fourth row male plate openings 20.

In the preferred embodiment, male plate 102 also includes a male plate access hole 401. Male plate access hole 401 extends from male plate first surface 104 towards and through male plate second surface 106. Preferably, male plate access hole 401 is generally centered on male plate 102 in relation to the plurality of male plate openings 20. In the preferred embodiment of eighteen (18) male plate openings 20 as previously disclosed, male plate access hole 401 is located between the second and third rows and in column 3 of the first and fourth rows of male plate openings 20.

Support plate 130 is attached to male plate 102 at male plate first surface 104. As best seen in FIGS. 4 and 5, support plate 130 comprises a first surface 132, a second surface 134, and a width 136. Support plate width 136 defines a support plate first end 138, second end 140, third end 142, and fourth end 144. Support plate first end 138 is located opposite to support plate second end 140. Support plate third end 142 is located opposite to support plate fourth end 144. Preferably, support plate first surface 132 is substantially parallel to support plate second surface 134 thereby ensuring that support plate width 136 is uniform along the entire configuration and shape of support plate 130.

In the preferred embodiment, support plate 130 is generally rectangular in shape with a notch 146 cut out therefrom. Notch 146 extends from support plate second end 140 through support plate 130 towards support plate first end 138. Notch 146 also extends from support plate first surface 132 towards and through support plate second surface 134. Notch 146 is intermediate support plate third end 142 and support plate fourth end 144. Preferably, notch 146 is centered in relation to support plate third end 142 and support plate fourth end 144.

Notch 146 defines a notch first end 148, a notch second end 150, and a notch third end 152. Notch first end 148 is intermediate support plate first end 138 and support plate second end 140. Notch second end 150 is proximate support plate third end 142, and notch third end 152 is proximate support plate fourth end 144.

Also preferably, the size, shape, and configuration of notch 146 is such that it is generally "C"-shaped. In this embodiment, notch first end 148 is the vertical section of the "C"-shape, with notch second end 150 and notch third end 152 being the horizontal sections of the "C"-shape. Preferably in this embodiment and in the embodiment in which support plate 130 is rectangular in shape, notch first end 148 is substantially parallel to support plate first end 138, notch second end 150 is substantially parallel to support plate third end 142, and notch third end 152 is substantially parallel to support plate fourth end 144.

Male plate 102 is fixedly attached to support plate 130 by way of first means for attaching 160. Male plate 102 is attached to support plate 130 so that support plate first end 138 abuts male plate first surface 104. Preferably, first means for attaching 160 attaches male plate first surface 104 to support plate first end 138 so that support plate first surface 132 is perpendicular to male plate first surface 104.

First means for attaching 160 preferably comprises a plurality of first fasteners 162. First fasteners 162 may comprise any of a number of threaded bolts 164 commonly known in the art. Each first fastener 162 is inserted through a male plate first fastener hole 110 and into an axially aligned support plate first fastener hole 154. Support plate first fastener hole 154 includes threading 166 which matches the threading of bolt 164. Preferably, male plate first fastener hole 110 also includes matching threading 112. Thus, as threaded bolt 164 is inserted into the holes, 110 and 154, it fixedly attaches male plate 102 to support plate 130.

In one embodiment, male assembly 100 also comprises at least one gusset 126 reinforcing the attachment between male plate 102 and support plate 130. Each gusset 126 includes a gusset top surface 127 and a gusset side surface 128. Each gusset 126 is attached by means commonly known in the art to male plate 102 and support plate 130 so that gusset top surface 127 abuts support plate second surface 134 and so that gusset side surface 128 abuts male plate first surface 104.

Preferably, male assembly 100 comprises two gussets 126. In this embodiment, one gusset 126 is attached to support plate second surface 134 SO that it is adjacent support plate third end 142. The other gusset 126 is attached to support plate second surface 134 so that it is adjacent support plate fourth end 144.

In the preferred embodiment, male plate 102 also comprises a pad 124 attached to male plate first surface 104. In the preferred embodiment, pad 124 has a generally rectangular cross-sectional area and is attached to male plate first surface 104 so as to surround the plurality of openings 20 of male plate 102 as well as each of the at least one horizontal guide posts 114, as will be described herein. In the preferred embodiment, pad 124 forms a square shape therein framing the plurality of openings 20 of male plate 102 as well as each of the horizontal guide posts 114. In this preferred embodiment, it is also preferable for one side of the square pad 124 to abut support plate first surface 132.

As best seen in FIGS. 2–3 and 6–8, female assembly 200 generally comprises a female plate 202 and a female housing 230. Female plate 202 comprises a female plate first surface 204, a female plate second surface 206, and a width 208. Female plate width 208 defines at least a female plate bottom surface 205. Preferably, female plate first surface 204 is substantially parallel to female plate second surface 206 thereby ensuring that width 208 is uniform along the entire configuration and shape of female plate 202.

Preferably, male plate 102 and female plate 202 are the same shape and configuration. Also preferably, male plate 102 and female plate 202 are both rectangular in shape.

As best shown in FIG. 10, female plate 202 includes a plurality of female plate openings 35. Each female plate opening 35 extends from female plate first surface 204 towards and through female plate second surface 206.

A female connecting element 37, well-known in the art, is disposed within each female plate opening 35 so that its engagement end 38 protrudes from female plate first surface 204 and so that its tubing attachment end 40 protrudes from female plate second surface 206. Female connecting element 37 may comprise a hydraulic or an electric connecting element. Each female connecting element 37 corresponds to and is matable with one male connecting element 22. Means for attaching female connecting element 39 attaches the tubing attachment end 40 of each female connecting element 37 to the female plate 202 by commonly known structures, such a retainer ring 41 and spacer ring 43. At tubing attachment end 40, each female connecting element 37 is connected to and is in fluid communication with a tubing 45, which tubing 45 collectively defines the second set of lines.

In the preferred embodiment, the number of female plate openings 35 is equal to the number of male plate openings 20. In addition, the pattern in which the plurality of female plate openings 35 is arranged is identical in shape, size, and relative distance between each opening 35 to the pattern of arrangement of the plurality of male plate openings 20. Thus, the male plate 102 and the female plate 202 may be set against each other so that each female plate opening 35 is axially aligned with its corresponding male plate opening 20.

Female housing 230 comprises a female housing first surface 232, a female housing second surface 234, a female housing top surface 236, a female housing bottom surface 238, and two opposing female housing side surfaces 239. Female housing first surface 232 is situated proximate female plate second surface 206. Female housing second surface 234 is situated distal female assembly second surface 206. Preferably, female housing 230 has a rectangular shape and cross-sectional area.

In the preferred embodiment, female assembly 200 further comprises a means for supporting tubing 68 which provides support to tubing 45 so that the attachment between tubing 45 and tubing attachment end 40 of each female connecting element 37 does not experience stress or tension as the female assembly 200 is transported.

In the preferred embodiment, means for supporting tubing 68 comprises a tubing support plate 70 and a tubing support bracket 85. Tubing support plate 70 is fixedly attached, by commonly known means such as first threaded bolts 16, preferably to the female plate bottom surface 205. From its attachment to female plate bottom surface 205, tubing support plate 70 extends in a direction away from female plate 202 at an obtuse angle in relation to female plate second surface 206.

Tubing support plate 70 includes a tubing support plate first surface 71, which is proximate female plate second surface 206, and a tubing support plate second surface 72, which is distal female plate second surface 206.

Tubing support bracket 85 is fixedly attached, by commonly known means such as a second threaded bolts and nuts 17, to tubing support plate first surface 71. Tubing support bracket 85 comprises a support bracket first part 86 and a support bracket second part 87. Preferably, support bracket first part 86 is at substantially a ninety degree angle from support bracket second part 87. Support bracket first part 86 is attached to tubing support plate first surface 71. Support bracket second part 87 extends from tubing support plate first surface 71. Preferably, support bracket second part 87 extends in a direction perpendicular to support plate first surface 71.

Support bracket second part 87 includes a plurality of holes 88, each containing a tubing connector 89 attached therein. The number of bracket second part holes 88 and tubing connectors 89 is equal to the number of female connecting elements 37 and tubing 45. From its connection to the tubing attachment end 40 of its corresponding female connecting element 37, each tubing 45 extends, is connected to, and is in fluid communication with one end of one tubing connector 89. In turn, the other end of each tubing connector 89 is connected to and in fluid communication with other tubing and hoses 18, a second set of lines.

In the preferred embodiment, means for supporting tubing 68 also comprises two triangular reinforcements 90. A triangular reinforcement 90 is attached by commonly known means, such as welding or fasteners, to tubing support plate first surface 71 and to tubing support bracket second part 87 at either side of the set of tubing 45.

Figure 3:
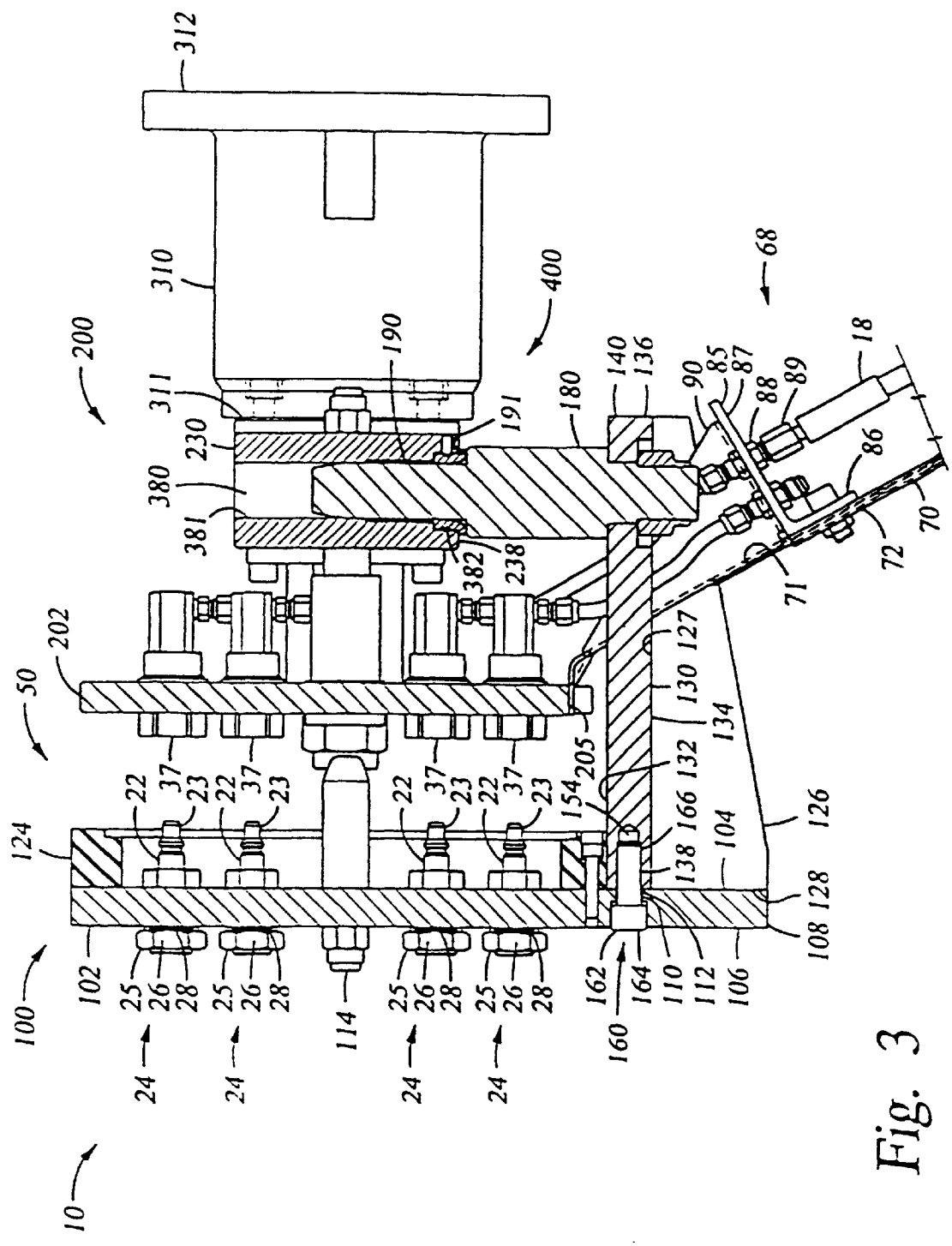
FIG. 3 is a cross-sectional view of the female assembly resting on the male assembly in the retracted position taken along line 3—3 of FIG. 2. Relevant fasteners and bolts are not shown as cross-sections for purposes of clarity.

Means for vertically aligning 400 preferably comprises at least one vertical guide post 180 and a corresponding vertical guide sleeve 380 for each vertical guide post 180. As best seen in FIGS. 3–5, each vertical guide post 180 is attached to male assembly 100, preferably to support plate 130. As best seen in FIGS. 3 and 7, each vertical guide sleeve 380 is disposed within female assembly 200, preferably within female housing 230. Each vertical guide sleeve 380 is sized and constructed to receive its corresponding vertical guide post 180.

Each vertical guide post 180 includes a vertical guide post first end 181, a vertical guide post second end 183, and a vertical guide post body 185. Preferably, each vertical guide post 180 is generally cylindrical in shape. Each vertical guide post 180 extends from support plate first surface 132 in a direction perpendicular to support plate first surface 132 so that vertical guide post first end 181 is distal support plate first surface 132 and so that vertical guide post second end 183 is proximate support plate first surface 132.

In one embodiment (not shown), each vertical guide post 180 is integral with support plate 130. In this embodiment, each vertical guide post second end 183 is attached to support plate first surface 132.

In another embodiment as shown, each vertical guide post 180 is inserted through a vertical guide post hole 182 on support plate 130 and secured thereto by a means for attaching vertical guide post 184. In this embodiment, each vertical guide post hole 182 extends from support plate second surface 134 towards and through support plate first surface 132.

Vertical guide post 180, in this embodiment, includes a first reduced diameter section 187 defined by a first lip 189. First reduced diameter section 187 must have a cross-sectional diameter that is slightly smaller than the cross-sectional diameter of vertical guide post hole 182. First reduced diameter section 187 is proximate vertical guide post second end 183.

In this embodiment, each vertical guide post 180 is inserted into its corresponding horizontal guide post hole 182 through support plate first surface 132 side so that [1] vertical guide post second end 183 extends out from support plate second surface 134; [2] vertical guide post first lip 189 abuts support plate first surface 132; and [3] first reduced diameter section 187 is held within vertical guide post hole 182.

In this embodiment, means for attaching vertical guide post 184 selectively fixedly attaches vertical guide post second end 183 to support plate second surface 134. In one embodiment, means for attaching vertical guide post 184 comprises threading 186 on vertical guide post body 185 adjacent vertical guide post second end 183 and a vertical guide post nut 188 having cooperative threading. Thus, once vertical guide post nut 188 is threadably attached on vertical guide post threading 186 whereby it abuts support plate second surface 134, vertical guide post 180 is fixedly attached within vertical guide post hole 182, clamped between first lip 189 and nut 188.

In the preferred embodiment and as best seen in FIG. 4, at least one vertical guide post 180 comprises two vertical guide posts 180. Each vertical guide post 180 is attached to support plate 130 proximate support plate second end 140. One vertical guide post 180 is attached to support plate 130 intermediate support plate third end 142 and notch second end 150. Preferably, such vertical guide post 180 is substantially centered between support plate third end 142 and notch second end 150. The other vertical guide post 180 is attached to support plate 130 intermediate support plate fourth end 144 and notch third end 152. Preferably, such vertical guide post 180 is substantially centered between support plate fourth end 144 and notch third end 152. Also preferably, both vertical guide posts 180 are located an equal distance away from support plate second end 140.

Each vertical guide post 180 includes a second reduced diameter section 190 defined by a second lip 191. Second lip 191 is located intermediate vertical guide post first end 181 and first lip 189. Second reduced diameter section 190 is adjacent and includes vertical guide post first end 181. Preferably, the reduction in cross-sectional diameter to second diameter section 190 occurs at one cross-sectional area of vertical guide post 180 so that second lip 191 is substantially perpendicular to vertical guide post body 185.

In the preferred embodiment, second reduced diameter section 190 is at least partially tapered 192 to vertical guide post first end 181. In another preferred embodiment, second reduced diameter section 190 is fully tapered from second lip 191 to vertical guide post first end 181.

As previously disclosed, means for vertically aligning 400 also comprises a vertical guide sleeve 380 for each vertical guide post 180. Each vertical guide sleeve 380 is preferably disposed in female housing 230.

Turning to FIGS. 3, 6, and 7, each vertical guide sleeve 380 extends through female housing 230. In the preferred embodiment, each vertical guide sleeve comprises an orifice 381 extending from female housing top surface 236 towards and through female housing bottom surface 238. Preferably, each orifice 381 extends in a direction perpendicular to female housing bottom surface 238.

In the preferred embodiment and as best seen in FIG. 6, at least one vertical guide sleeve 380 comprises two orifices 381. Each orifice 381 is located intermediate one of the two opposing female housing side surfaces 239 and the female housing bore 240, as will be disclosed herein.

Each orifice 381 is sized and constructed to receive the second reduced diameter section 190 of a vertical guide post 180. Thus, the cross-sectional diameter of each orifice 381 must be slightly larger than the cross-sectional diameter of its corresponding second reduced diameter section 190.

Furthermore, the cross-sectional diameter of each orifice 381 must be sized so that, when the second reduced diameter section 190 of a vertical guide post 180 is inserted within the orifice 381, female housing bottom surface 238 abuts and rests on the vertical guide post second lip 191.

In a preferred embodiment, adjacent female housing bottom surface 238 and partially protruding therefrom, each orifice 381 includes an annular bushing 382. Bushing 382 includes a bushing first end 383, a bushing second end 384, a bushing inner surface 395, and a bushing outer surface 396.

Preferably, each orifice 381 includes an enlarged diameter section 397 which receives bushing 382. Bushing 382 sits within orifice enlarged diameter section 397 so that bushing second end 384 protrudes from female housing bottom surface 238. Preferably, bushing inner surface 395 is at least partially tapered from bushing second end 384 towards bushing first end 383. In the preferred embodiment, bushing inner surface 395 is completely tapered from bushing second end 384 to bushing first end 383.

Bushing 382 is maintained within orifice 381 by a set screw 398. Female housing 230 includes a set screw hole 388 extending from either female housing first or second surface, 232 or 234, towards and through orifice enlarged diameter section 397. With bushing 382 inserted within orifice enlarged diameter section 397, set screw 398 is inserted within set screw hole 399 and then engaged against bushing outer surface 396.

Figure 2:
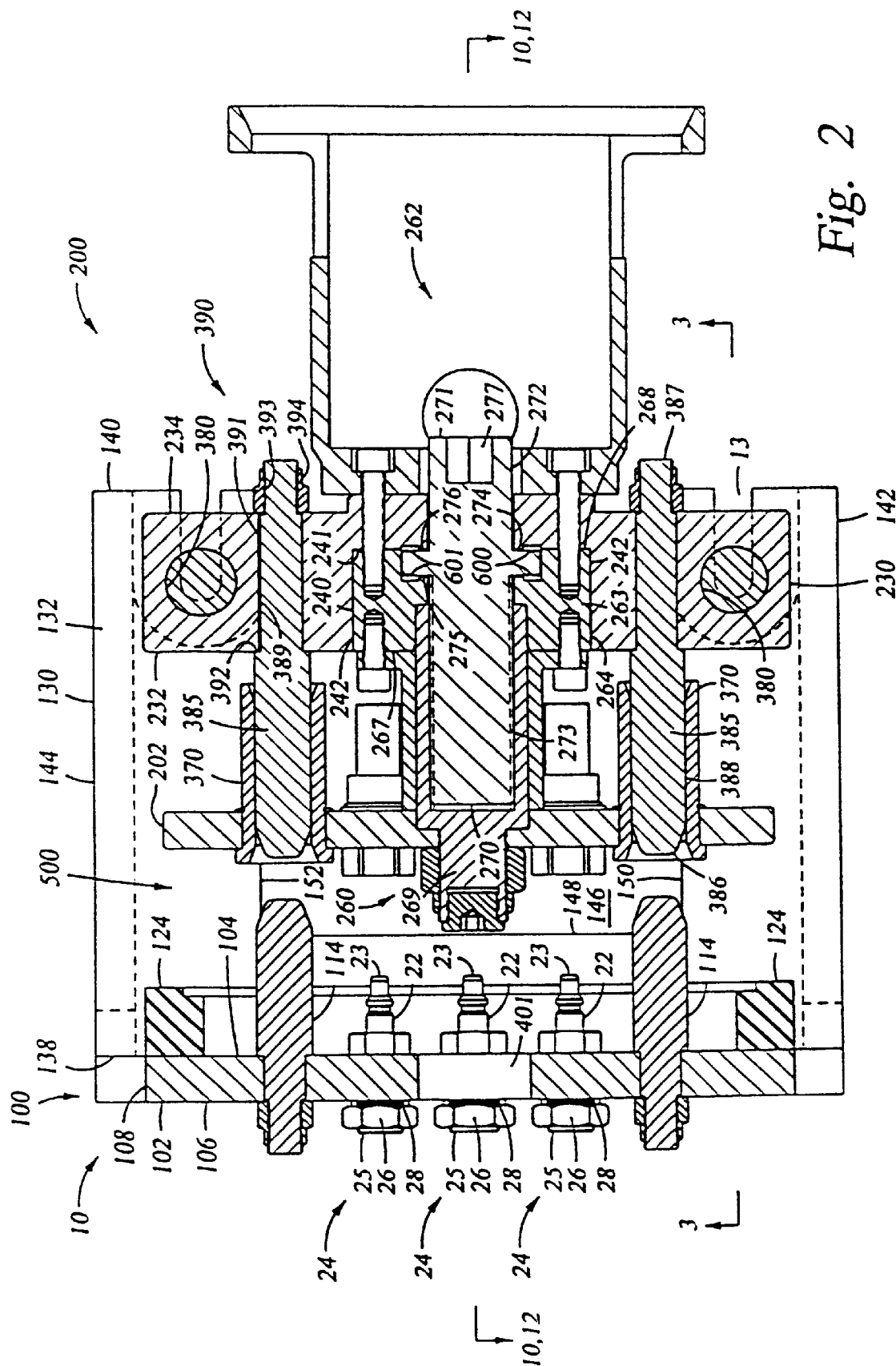
FIG. 2 is a cross-sectional view of the female assembly resting on the male assembly in the retracted position taken along line 2—2 of FIG. 1. Relevant fasteners and bolts are not shown as cross-sections for purposes of clarity.

Means for horizontally aligning 500 comprises at least one horizontal guide post 114 and a corresponding horizontal guide sleeve 370 for each horizontal guide post. As best seen in FIGS. 2, 4, and 5, each horizontal guide post 114 is attached to male assembly 100, preferably to male plate 102. As best seen in FIGS. 2, 6, and 8, each horizontal guide sleeve 370 is attached to female assembly 20, preferably to female plate 202. Preferably, means for horizontally aligning 500 also comprises a means for extending 260 the female assembly 200 towards the male assembly 100 to enable the insertion of each horizontal guide post 114 in its corresponding horizontal guide sleeve 370.

In the preferred embodiment, means for horizontally aligning 500 further comprises a corresponding alignment post 385 for each horizontal guide sleeve 370. Each alignment post 385 is attached to female assembly 200, preferably to female housing 230.

Turning to FIG. 4, each horizontal guide post 114 includes a horizontal guide post first end 115, a horizontal guide post second end 117, and a horizontal guide post body 119. Preferably, each horizontal guide post 114 is generally cylindrical in shape. Each horizontal guide post 114 preferably extends from male plate first surface 104 in a direction perpendicular to male plate first surface 104 so that horizontal guide post first end 115 is distal male plate first surface 104 and so that horizontal guide post second end 117 is proximate male plate first surface 104.

In one embodiment (not shown), each horizontal guide post 114 is integral with male plate 102. In this embodiment, each horizontal guide post second end 117 is attached to male plate first surface 104.

In another embodiment as shown, each horizontal guide post 114 is inserted through a horizontal guide post hole 116 on male plate 102 and secured thereto by a means for attaching horizonal guide post 118. In this embodiment, each horizontal guide post hole 116 extends from male plate second surface 106 towards and through male plate first surface 104.

Horizontal guide post 114, in this embodiment, includes a reduced diameter section 121 defined by a lip 123. Reduced diameter section 121 must have a cross-sectional diameter that is slightly smaller than the cross-sectional diameter of horizontal guide post hole 116. Reduced diameter section 121 is proximate horizontal guide post second end 117.

In this embodiment, each horizontal guide post 114 is inserted into its corresponding horizontal guide post hole 116 through male plate first surface 104 side so that [1] horizontal guide post second end 117 extends out from male plate second surface 106; [2] horizontal guide post lip 123 abuts male plate first surface 104; and [3] reduced diameter section 121 is held within horizontal guide post hole 116.

In this embodiment, means for attaching horizonal guide post 118 selectively fixedly attaches horizontal guide post second end 117 to male plate second surface 106. In one embodiment, means for attaching horizonal guide post 118 comprises threading 120 on horizontal guide post body 119 adjacent horizontal guide post second end 117 and a horizontal guide post nut 122 having cooperative threading. Thus, once horizontal guide post nut 122 is threadably attached on horizontal guide post threading 120 whereby it abuts male plate second surface 106, horizontal guide post 114 is fixedly attached within horizontal guide post hole 116, clamped between lip 123 and nut 122.

In the preferred embodiment, at least one horizontal guide post 114 comprises two horizontal guide posts 114. In the embodiment in which male plate openings 20 are arranged in a pattern of rows and columns, a horizontal guide post 114 is located at each side of the set of columns, preferably centered in respect to the set of rows. In the embodiment including eighteen openings 20, each horizontal guide post 114 is intermediate the second and third rows.

Turning to FIG. 8, each horizontal guide sleeve 370 extends through female plate 202 through a female plate horizontal guide plate orifice 376. Each horizontal guide plate orifice 376 extends from female plate first surface 204 towards and through female plate second surface 206.

Each horizontal guide sleeve 370 preferably includes a horizontal guide sleeve first end 371, a horizontal guide sleeve second end 372, a horizontal guide sleeve cavity 373, a horizontal guide sleeve inner surface 374, a horizontal guide sleeve outer surface 375, and a horizontal guide sleeve flange section 377. Horizontal guide sleeve cavity 373 extends from horizontal guide sleeve first end 371 towards and through horizontal guide sleeve second end 372 thereby defining horizontal guide sleeve inner surface 374. Preferably, horizontal guide sleeve cavity 373 also includes a first taper 20 adjacent horizontal guide sleeve first end 371 as well as a second taper 21 adjacent horizontal guide sleeve second end 372.

Horizontal guide sleeve flange section 377 is proximate horizontal guide sleeve first end 371 and extends in a radial direction outwardly from horizontal guide sleeve outer surface 375. In the preferred embodiment, horizontal guide sleeve flange section 377 coincides with horizontal guide sleeve first end 371 and is flush therewith.

The cross-sectional diameter of horizontal guide sleeve outer surface 375 must be slightly less than the cross-sectional diameter of its corresponding horizontal guide sleeve orifice 376. In addition, the cross-sectional diameter of horizontal guide sleeve flange section 377 is larger than the cross-sectional diameter of its corresponding horizontal guide sleeve orifice 376. Furthermore, the cross-sectional diameter of horizontal guide post body 114 must be slightly less than the cross-sectional diameter of horizontal guide sleeve inner surface 374.

Each horizontal guide sleeve 370 is preferably inserted into a horizontal guide sleeve orifice 376 so that [1] horizontal guide sleeve first end 371 is proximate female plate first surface 204; [2] horizontal guide sleeve second end 372 is proximate female plate second surface 206; and [3] horizontal guide sleeve flange section 377 abuts female plate first surface 204.

Means for attaching horizontal guide sleeve 378 fixedly attaches each horizontal guide sleeve 370 within its corresponding horizontal guide sleeve orifice 376 to female plate 202. In the preferred embodiment, means for attaching horizontal guide sleeve 378 comprises a first retaining ring 379 and a groove 382 around the circumference of horizontal guide sleeve outer surface 375.

Groove 382 is situated on horizontal guide sleeve outer surface 375 so that, when horizontal guide sleeve 370 is inserted into a horizontal guide sleeve orifice 376 and horizontal guide sleeve flange section 377 abuts female plate first surface 204, groove 382 is adjacent female plate second surface 206. First retaining ring 379 is then placed within groove 382 against female plate second surface 206 thereby fixedly attaching female plate 202 to horizontal guide sleeve 370.

In the preferred embodiment and turning to FIG. 2, means for horizontally aligning 500 further comprises one alignment post 385 for each horizontal guide sleeve 370. Each alignment post 385 comprises an alignment post first end 386, an alignment post second end 387, and an alignment post body 388. Each alignment post 385 preferably extends from female housing first surface 232 in a direction perpendicular to female housing first surface 232 so that alignment post first end 386 is distal female housing 230 and so that alignment post second end 387 is proximate female housing 230.

Each alignment post 385 must be axially aligned with its corresponding horizontal guide sleeve 370. In addition, the cross-sectional diameter of each alignment post 385 must be slightly smaller than the cross-sectional diameter of its corresponding horizontal guide sleeve inner surface 374.

In one embodiment (not shown), each alignment post 385 is integral with female housing 230. In this embodiment, each alignment post second end 387 is attached to female housing first surface 232.

In another embodiment as shown, each alignment post 385 is inserted through an alignment post hole 389 on female housing 230 and secured thereto by an means for attaching alignment post 390. In this embodiment, each alignment post hole 389 extends from female housing second surface 234 towards and through female housing first surface 232.

Alignment post 385, in this embodiment, includes a reduced diameter section 391 defined by a lip 392. Alignment post reduced diameter section 391 must have a cross-sectional diameter that is slightly smaller than the cross-sectional diameter of alignment post hole 389. Alignment post reduced diameter section 391 is proximate alignment post second end 387.

In this embodiment, each alignment post 385 is inserted into its corresponding alignment post hole 389 through the female housing first surface 232 side so that [1] alignment post second end 387 extends out from female housing second surface 234; [2] alignment post lip 392 abuts female housing first surface 232; and [3] alignment post reduced diameter section 391 is held within alignment post hole 389.

In this embodiment, means for attaching alignment post 390 fixedly attaches alignment post second end 387 to female housing second surface 234. In one embodiment, means for attaching alignment post 390 comprises threading 393 on alignment post reduced diameter section 391 adjacent alignment post second end 387 and an alignment post nut 394 having cooperative threading. Thus, once alignment post nut 394 is threadably attached on alignment post reduced diameter section threading 393 whereby it abuts female housing second surface 234, alignment post 385 is fixedly attached within alignment post hole 389 clamped between lip 393 and nut 394.

As previously disclosed, means for horizontally aligning 500 preferably also comprises a means for extending 260. As best seen in FIGS. 2, 6, and 8, means for extending 260 connects the second surface 206 of female plate 202 to the first surface 232 of female housing 230 so that female assembly 200, preferably female plate 202, may be selectively extended to and retracted from male assembly 100, preferably male plate 102. Thus, means for extending 260 enables the insertion of each horizontal guide post 114 in its corresponding horizontal guide sleeve 370.

In the preferred embodiment, means for extending 260 generally comprises a screw jack 262 threadably engaged with a screw jack coupling 264. Screw jack 262 is rotatably attached to female housing 230. Screw jack coupling 264 is fixedly engaged to female plate 202. Therefore, rotation of screw jack 262 in one direction extends female plate 202 away from female housing 230 and towards male plate 102 and rotation of screw jack 262 in the opposite direction retracts female plate 202 from male plate 102 and towards female housing 230.

As best shown in FIG. 6, screw jack 262 is preferably located within a screw jack housing 263. Screw jack housing 263 comprises a screw jack housing first surface 267, a screw jack housing second surface 268, and a width 269. Preferably, screw jack housing 263 has a rectangular shape and cross-sectional area.

Screw jack housing 263 is situated in a bore 240 located on female housing 230 (see FIG. 2). Bore 240 extends from female housing first surface 232 towards female housing second surface 234. Bore 240 is defined within female housing 230 by a bore first surface 241 and a bore second surface 242. Preferably, bore 240 has a rectangular cross-sectional area so that bore second surface 242 comprises four bore second surfaces 242. Also preferably, bore 240 is centered between female housing bottom surface 238 and female housing top surface 236 and between the two opposing female housing side surfaces 239.

Screw jack housing 263 is sized and shaped so that it snugly fits within bore 240. Screw jack housing 263 is inserted into bore 240 so that screw jack housing second surface 268 abuts bore first surface 241 and so that the screw jack housing width 269 abuts bore second surface 242. In the preferred embodiment, when screw jack housing 263 is inserted within bore 240, screw jack housing first surface 267 is flush with female housing first surface 232.

Turning to FIG. 6, means for attaching screw jack housing 320 fixedly attaches screw jack housing 263 within female housing bore 240. In the preferred embodiment, means for attaching screw jack housing 320 comprises at least one threaded fastener 321 as well as a female housing hole 322 and screw jack housing hole 323 for each threaded fastener 321. Each female housing hole 322 extends from the female housing second surface 234 towards and through bore first surface 241. Each screw jack housing hole 323 extends from screw jack housing second surface 268 towards screw jack housing first surface 267 partially through screw jack housing 263. The cross-sectional diameter of each female housing hole 323 and its corresponding screw jack housing hole 322 are substantially equal.

The relative positions of each female housing hole 322 and its corresponding screw jack housing hole 323 are such that the two holes, 322 and 323, are axially aligned. Each threaded fastener 321 may then be inserted into a female housing hole 322 and its corresponding screw jack housing hole 323.

Screw jack housing hole 323 includes threading 325. Thus, as threaded fastener 321 is inserted therein, threaded fastener 321 threadably engages the threading 325 of screw jack housing hole 323. In the preferred embodiment, in addition to screw jack housing hole 323 including threading 325, female housing hole 322 also includes matching threading 324. Thus, as threaded fastener 321 is inserted into female housing hole 322 and screw jack housing hole 323, threaded fastener 321 threadably engages the threading 324 of female housing hole 322 as well as the threading 325 of screw jack housing hole 323. Thus, screw jack housing 263 is fixedly attached to female housing bore 240.

Screw jack 262 is inserted and held within screw jack housing 263 and female housing 230. In order to house screw jack 262, screw jack housing 263 and female housing 230 must each include a passage therethrough. Female housing 230 includes a female housing passage 243 having a cross-sectional area shape corresponding to the cross-sectional area shape of screw jacket 262. Screw jack housing 263 includes a screw jack passage 279 as well as a screw jack groove 280, each having a cross-sectional area shape corresponding to the cross-sectional area shape of screw jack 262.

Screw jack 262 preferably includes a screw jack first end 270, a screw jack second end 271, a screw jack body 272, and a screw jack enlarged diameter section 274. Screw jack 262 is preferably cylindrical in shape.

Screw jack 262 includes threading 273 on screw jack body 272 extending from screw jack first end 270 partially towards screw jack second end 271. Screw jack enlarged diameter section 274 is located intermediate screw jack threading 273 and screw jack second end 271. Screw jack enlarged diameter section 274 is defined on screw jack body 272 by a screw jack first lip 275, at the cross-sectional area where the diameter enlargement occurs, and a screw jack second lip 276, at the cross-sectional area where the diameter reduction occurs. Screw jack first lip 275 is proximate screw jack first end 270, and screw jack second lip 276 is proximate screw jack second end 271. Screw jack first lip 275 and screw jack second lip 276 are preferably both perpendicular to screw jack body 272.

Screw jack second end 271 includes a key slot 277. Key slot 277 matches and is activated by a key. Although not shown in the Figures, the key must be configured so that it may be easily and securely carried long distances by an ROV.

Female housing passage 243 extends from the bore first surface 241 towards and through female housing second surface 234. In this embodiment, the cross-sectional diameter of female housing passage 243 must be slightly larger than the cross-sectional diameter of the section of screw jack 262 between enlarged diameter section 274 and screw jack second end 271. Thus, screw jack 262 may rotate within and is securely held within female housing passage 243. Preferably, female housing passage 243 is centered on bore first surface 241.

Screw jack housing passage 279 extends from screw jack housing first surface 267 towards and through screw jack housing second surface 268. The cross-sectional diameter of screw jack housing passage 279 must be slightly larger than the cross-sectional diameter of the section of screw jack 262 between enlarged diameter section 274 and screw jack first end 270. Thus, screw jack 262 may rotate within and is securely held within screw jack housing passage 279. Preferably, screw jack housing passage 279 is centered on screw jack housing first surface 267.

In addition to screw jack housing passage 279, screw jack housing 263 also includes a screw jack housing groove 280 to accommodate screw jack enlarged diameter section 274. Screw jack housing groove 280 is located on screw jack housing passage 279. The size and shape of screw jack housing groove 280 must be slightly larger than screw jack enlarged diameter section 274 so that enlarged diameter section 274 may rotate within and be secured within screw jack housing groove 280. Preferably, screw jack housing groove 280 is located on screw jack housing passage 279 immediately adjacent to screw jack housing second surface 268 so that screw jack second lip 276 abuts bore first surface 241 when female housing 230, screw jack 262, and screw jack housing 263 are engaged in their correct positions.

Screw jack 262 must be able to rotate about its longitudinal axis in response to a turning of the key within key slot 277. Thus, screw jack 262 as well as all parts abutting screw jack 262 are machined, sized, and positioned to allow for such rotation.

Means for extending 260 also preferably includes two guiding inserts 600, one abutting screw jack first lip 275 and the other abutting screw jack second lip 276. Each guiding insert 600 prevents metal to metal contact between screw jack housing groove 280 and enlarged diameter section 274 as screw jack 272 rotates. Preferably, each guiding insert 600 is constructed from a hard, wearable plastic material, such as POM, and has a ring shape. Each guiding insert 600 is positioned within an insert slot 601 which is located on screw jack housing groove 280 adjacent to and on either side of enlarged diameter section 274.

The relative size and location of female housing 230, screw jack housing 263, and screw jack 262 is such that, when such parts are engaged in their correct positions, a substantial section of screw jack body 272 containing threading 273 thereon extends out from screw jack housing first surface 267 and key slot 277 is readily accessible from a direction proximate female housing second surface 234.

Turning to FIG. 8, screw jack coupling 264 is cooperatively threadably engaged at a first end 281 to the threading 273 of screw jack 262 which extends out from screw jack first surface 267. At a second end 282, screw jack coupling 264 is fixedly attached to female plate 202. Screw jack coupling 264 preferably comprises a screw jack coupling first end 281, a screw jack coupling second end 282, a screw jack coupling body 283, and a screw jack coupling cavity 284.

Screw jack coupling cavity 284 extends from screw jack coupling first end 281 towards screw jack coupling second end 282 partially through screw jack coupling 264. Screw jack coupling cavity 284 is defined by a cavity mating surface 285 and a cavity rear surface 286. Cavity mating surface 285 includes cavity threading 287 which is sized to cooperatively mate and engage with screw jack threading 273. Thus, in order to allow such cooperative mating and engagement, the cross-sectional diameter of screw jack coupling cavity 284 is slightly larger than the cross-sectional diameter of the section of screw jack 262 which is intermediate screw jack first end 270 and enlarged diameter section 274.

Screw jack coupling 264 also preferably includes a screw jack coupling reduced diameter section 288. Screw jack coupling reduced diameter section 288 is defined by a screw jack coupling lip 289 located intermediate cavity rear surface 286 and screw jack coupling second end 282. Screw jack coupling reduced diameter section 288 extends from screw jack coupling lip 289 towards and to screw jack coupling second end 282. In the preferred embodiment, screw jack coupling lip 289 is perpendicular to screw jack coupling body 283.

In order to house screw jack coupling 264, female plate 202 must include a passage therethrough. Female plate passage 291 extends from female plate first surface 204 towards and through female plate second surface 206. Preferably, female plate passage 291 is centered on female plate 202 in relation to the pattern of female plate openings 35.

In one preferred embodiment (not shown), the cross-sectional diameter of female plate passage 291 is slightly larger than the cross-sectional diameter of screw jack coupling reduced diameter section 288. Thus, screw jack coupling reduced diameter section 288 snugly fits within and is secured by female plate passage 291. In this preferred embodiment, when screw jack coupling reduced diameter section 288 is inserted within female plate passage 291, screw jack coupling lip 289 abuts female plate second surface 206.

In another preferred embodiment as shown, in addition to female plate passage 291, female plate 202 also includes a female plate notch 292 adjacent female plate second surface 206 to accommodate the screw jack coupling lip 289 inside of female plate passage 291. Thus, the cross-sectional diameter of female plate notch 292 is larger than the cross-sectional diameter of female plate passage 291. Furthermore, the cross-sectional diameter of female plate notch 292 is slightly larger than the cross-sectional diameter of screw jack coupling 264 intermediate screw jack coupling lip 289 and screw jack coupling first end 281. Thus, such section of screw jack coupling 264 snugly fits within and is secured by female plate notch 292. In this embodiment, female plate notch 292 is partially defined by a female plate notch shoulder 293. When screw jack coupling 264 is within female plate passage 291 and female plate notch 292, screw jack coupling lip 289 abuts female plate notch shoulder 293.

Means for attaching screw jack coupling 266 fixedly attaches screw jack coupling 264 to female plate 202. In the preferred embodiment, means for attaching screw jack coupling 266 comprises threading 290 on screw jack coupling reduced diameter section 288 and a screw jack coupling nut 294 having matching and cooperative internal threading. In this embodiment, screw jack coupling 264, reduced diameter section 288, and female plate 202 must be sized so that at least a part of reduced diameter section 288 protrudes from female plate first surface 204 when screw jack coupling 264 is inserted within female plate passage 291. Screw jack coupling nut 294 is then cooperatively mated with the reduced diameter section 290 extending from female plate first surface 204. Thus, screw jack coupling nut 294 fixedly attaches screw jack coupling 264 to female plate 202.

In one embodiment, means for attaching screw jack coupling 266 also comprises an end cap 295. End cap 295 is connected, by means well known in the art, to screw jack coupling nut 294.

Means for attaching screw jack coupling 266, screw jack coupling 264, screw jack coupling nut 294, and screw jack coupling end cap 295 must be sized and shaped so that they can be easily inserted and can extend into male plate access hole 401. Furthermore, male plate access hole 401 must be located on male plate male plate 102 so that means for attaching screw jack coupling 266, screw jack coupling 264, screw jack coupling nut 294, and screw jack coupling end cap 295 are axially aligned with male plate access hole 401 at the same time that male plate openings 20 are axially aligned with female plate openings 35.

In another embodiment (not shown), screw jack coupling 264 is integral with female plate 202. In this embodiment, screw jack coupling 264 need not include reduced diameter section 288 or means for attaching screw jack coupling 266.

Screw jack threading 273 cooperatively mates with screw jack coupling cavity threading 287. Thus, by rotating screw jack 262, screw jack coupling 264 and female plate 202 extend or retract from screw jack 262 and female housing 230. In one position, referred to as the retracted position 50 of means for extending 260, means for extending 260 is actuated so that screw jack coupling first end 281 abuts screw jack housing first surface 267 (see FIGS. 2 and 10). In another position, referred to as the extended position 60, means for extending 260 is actuated so that screw jack coupling first end 281 is farthest away from screw jack housing first surface 267 while screw jack threading 273 remains cooperatively mated with screw jack coupling cavity threading 287 (see FIGS. 11 and 12).

In the preferred embodiment shown in the Figures, when means for extending 260 is in the retracted position 50, screw jack coupling 264 extends within screw jack housing 263 into a screw housing slot 15. In this embodiment, screw jack housing slot 15 accommodates screw jack coupling first end 281. Screw jack housing slot 15 extends from screw jack housing first end 267 towards screw jack housing second end 268 and partially through screw jack housing 263. Screw jack housing slot 15 must have a cross-sectional diameter larger than and must be axially aligned with screw jack housing passage 279.

In one embodiment as shown in FIGS. 8 and 9, female assembly 200 also comprises a spacer 300. Spacer 300 surrounds screw jack coupling 264 and is preferably attached to screw jack housing first surface 267. Spacer 300 is generally tubular in shape. Spacer 300 includes a spacer first end 301, a spacer second end 302, a spacer opening 306, a spacer inner surface 303, and a spacer flange section 304. Spacer second end 302 abuts screw jack housing first surface 267. Spacer first end 301 is distal screw jack housing first surface 267. Spacer opening 306 extends from spacer first end 301 towards and through spacer second end 302.

Spacer flange section 304 coincides and is flush with spacer second end 302 and extends radially outward from spacer outer surface 305. Thus, spacer flange section 304 also abuts screw jack housing first surface 267.

The cross-sectional diameter of spacer inner surface 303 must be slightly larger than the cross-sectional diameter of screw jack coupling body 283. Thus, screw jack coupling 264 fits within spacer opening 306 and screw jack coupling body 283 is adjacent to spacer inner surface 303.

In the preferred embodiment, spacer 300 is sized so that when means for extending 260 is in the retracted position 50, spacer first end 301 abuts female plate second surface 206.

Means for attaching spacer 350 fixedly attaches spacer 300 to screw jack housing first surface 267. In the preferred embodiment, means for attaching spacer 350 comprises at least one threaded fastener 351 as well as a spacer opening 352 and screw jack housing opening 353 for each threaded fastener 351. Each spacer opening 352 extends through spacer flange section 304. Each screw jack housing opening 353 extends from screw jack housing first surface 267 towards screw jack housing second surface 268 partially through screw jack housing 263. The cross-sectional diameter of each spacer opening 353 and its corresponding screw jack housing opening 352 are substantially equal.

The relative positions of each spacer opening 352 and its corresponding screw jack housing opening 353 are such that the two holes, 352 and 353, are axially aligned. Each threaded fastener 351 is then inserted into a spacer opening 352 and its corresponding screw jack housing opening 353.

Screw jack housing opening 353 includes threading 355. Thus, as threaded fastener 351 is inserted therein, threaded fastener 351 threadably engages the threading 355 of screw jack housing opening 353. In the preferred embodiment, in addition to screw jack housing opening 353 including threading 355, female housing opening 352 also includes matching threading 354. Thus, as threaded fastener 351 is inserted into female housing opening 352 and screw jack housing opening 353, threaded fastener 351 threadably engages the threading 354 of spacer opening 352 as well as the threading 325 of screw jack housing opening 353. Thus, spacer 300 is fixedly attached to screw jack housing 263.

In one embodiment as shown in FIGS. 3 and 8, female assembly 200 also comprises a key slot guard 310. Key slot guard 310 is cylindrical in shape. Key slot guard 310 includes a guard first end 311, a guard second end 312, a guard cavity 313, and a guard passage 314. Guard cavity 313 extends from guard second end 312 towards and partially to guard first end 311 thereby defining a guard cavity first surface 315. Guard cavity passage 314 extends from guard cavity surface 315 towards and through guard first end 311.

The cross-sectional diameter of guard cavity 313 is larger than the cross-sectional diameter of guard passage 314. The cross-sectional diameter of guard passage 314 is at least slightly larger than the cross-sectional diameter of screw jack body 272. In assembled form, guard first end 311 abuts female housing second surface 234 so that screw jack 262 is inserted within guard passage 314.

The size of screw jack 262, key slot guard 310, guard cavity 313, and guard passage 314 must be such that key slot 277 on screw jack second end 271 is easily accessible from guard cavity 313. In the preferred embodiment, screw jack second end 271 extends into and through guard passage 314 so that it protrudes from guard cavity surface 315.

Preferably, guard cavity 313 is centered on key slot guard 310. Also preferably, guard passage 314 is centered on guard cavity surface 315 and key slot guard 310.

Means for attaching key slot guard 340 fixedly attaches key slot guard 310 to female housing second surface 234. In the preferred embodiment, means for attaching key slot guard 340 comprises the preferred embodiment of the previously disclosed means for attaching screw jack housing 320 as well as one guard hole 316 corresponding to each set of threaded fastener 321, female housing hole 322, and screw jack housing hole 323. Each guard hole 316 extends from guard cavity surface 315 towards and through guard first end 311. The cross-sectional diameter of each guard hole 316 is substantially equal to the cross-sectional diameters of its corresponding female housing hole 322 and screw jack housing hole 323.

The relative positions of each guard hole 316 and its corresponding screw jack housing hole 323 and female housing hole 322 are such that the three holes, 316, 322 and 323, are axially aligned. Each threaded fastener 321 is then inserted into a guard hole 316 and its corresponding screw jack housing hole 323 and female housing hole 322. Thus, as threaded fastener 321 is inserted therein, threaded fastener 321 threadably engages the threading 325 of screw jack housing hole 353 (as well as the threading 324 of female housing hole 322 in the preferred embodiment). Thus, key slot guard 310 is fixedly attached to female housing 230.

With respect to the alignment posts 385 of means for horizontally aligning 500, the length of each alignment post 385 is such that, when means for extending 260 is in the retracted position 50, each alignment post 385 extends at least partially through the second end 372 and into the cavity 373 of its corresponding horizontal guide sleeve 370. Preferably, the length of each alignment post 385 is such that, when means for extending 260 is in the retracted position 50, each alignment post 385 extends into the cavity 373 of its corresponding horizontal guide sleeve 370 so that alignment post first end 386 is adjacent horizontal guide sleeve first end 371.

Means for functionally engaging 258 ensures the functional coupling of male and female assemblies, 100 and 200 (see FIGS. 6 and 7). More specifically, means for functionally engaging 258 couples the vertically and horizontally aligned female and male connecting elements, 37 and 22. In turn, the functional engagement of female and male connecting elements, 37 and 22, creates the connection between the first and second set of lines.

In the preferred embodiment, means for functionally engaging 258 comprises the means for extending 260 when the means for extending 260 moves into and is in the extended position 60. Turning back to FIGS. 11 and 12, extended position 60 is thus preferably further defined by the female plate 202 being extended towards the male plate 102 so that the plurality of female connecting elements 37 come into functional engagement with the plurality of male connecting elements 22. As will be described herein, because the male and female connecting elements, 22 and 37, are already vertically and horizontally aligned, continued activation of means for extending 260 towards the extended position 60 ensures the smooth and aligned mating of the connecting elements, 22 and 37.

IN OPERATION

The goal of the operation is to ensure the proper and precise alignment and subsequent engagement of the male connecting elements 22 of male assembly 100 to the female connecting elements 37 of female assembly 200. Means for vertically aligning 400 and means for horizontally aligning 500 ensure that, during the coupling, male assembly 100 and female assembly 200 are correctly aligned so as to provide precise and proper coupling. It is understood that both means for vertically aligning 400 and means for horizontally aligning 500 are necessary to provide proper and precise alignment. Once correctly aligned, means for functionally engaging 258 couples the female connecting elements 37 to the male connecting elements 22.

Initially, male assembly 100 is fixedly attached to a cage or enclosure in the sub-sea environment so that male plate first surface 104 is accessible from outside the cage or enclosure. Also initially, female assembly 200 and means for extending 260 are in the retracted position 50. Female assembly 200 is transported from the surface of the ocean to the undersea location of male assembly 100.

As female assembly 200 is transported in the underwater environment, female assembly 200 pulls the tubing and hoses 18 to which it is attached through the water. Means for supporting tubing 68 ensures that [1] female connecting elements 37 do not become disengaged from tubing 45 and [2] the attachment between tubing 45 and its corresponding female connecting element 37 does not fail or become damaged. Means for supporting tubing 68 accomplishes these objectives by the inclusion of tubing support bracket 85 containing a tubing connector 89 for each tubing 45. Surface tubing and hoses 18 are attached only to tubing connector 89. Thus, tubing connectors 89 absorb most, if not all, of the tension created as female assembly 200 pulls the tubing and hoses 18 through the water. In this way, tubing 45 and its connection to its corresponding female connecting element 37 is unaffected during the transportation of female assembly 200.

Once female assembly 200 is proximate male assembly 100, female assembly 200 is oriented so that female plate first surface 204 is proximate and generally parallel to male plate first surface 104. Female assembly 200 is then lifted above support plate 130 and each vertical guide post 180 so that tubing support plate 70 and tubing support bracket 85 extend downward through support plate notch 146.

Next, means for vertically aligning 400 is activated. Each vertical guide sleeve 380 is lowered onto its corresponding vertical guide post 180. It is noted that, in order to effectuate this step, the location of each vertical guide post 180 in relation to support plate 130 and the location of its corresponding vertical guide sleeve 380 in relation to female housing 230 must be such that each vertical guide post 180 is axially aligned with its corresponding vertical guide sleeve 380 when female plate first surface 204 is parallel to male plate first surface 104.

Each vertical guide sleeve 380 is lowered onto its corresponding vertical guide post 180 until second reduced diameter section 190 is completely within vertical guide sleeve 380 and until vertical guide post second lip 191 abuts female housing bottom surface 238, or, in the preferred embodiment, bushing second end 384. The at least partially tapered bushing inner surface 395 aids in the insertion of the corresponding vertical guide post 180. Thus, vertical guide sleeve 380 rests on vertical guide post second lip 191.

The length of vertical guide post second reduced diameter section 190 and the relatively equal cross-sectional diameters of vertical guide sleeve 380 and vertical guide post reduced diameter section 190 ensure that, once vertical guide sleeve 380 rests on vertical guide sleeve second lip 191, female assembly 200 is secured on male assembly 100. Further, all relevant components must be sized so that, once vertical guide sleeve 380 rests on vertical guide sleeve second lip 191, each female plate opening 35 is substantially axially aligned with its corresponding male plate opening 20. Thus, means for vertically aligning 400 properly aligns female assembly 200 to male assembly 100 in the vertical direction.

It is noted that, once means for vertically aligning 400 has properly aligned female assembly 200 with male assembly 100, male plate 102 and female plate 202 must be separated by a sufficient distance so that none of the parts of each plate, 102 and 202, which cooperatively mate are in abutment.

The location of each horizontal guide post 114 in relation to male plate 102 and the location of its corresponding horizontal guide sleeve 370 in relation to female plate 202 must be such that, once means for vertically aligning 400 has properly aligned female assembly 200 with male assembly 100 in the vertical direction, each horizontal guide post 114 is substantially axially aligned with its corresponding horizontal guide sleeve 370.

Next, means for horizontally aligning 500 is activated. The key is inserted through the guard cavity 313 of key slot guard 310 into key slot 277. Means for extending 260 is activated by turning the key in the pre-determined direction within key slot 277. Once means for extending 260 is activated, female plate 202 begins to move from its retracted position 50 to its extended position 60.

By turning the key within key slot 277, screw jack 262 rotates within female housing passage 243, screw jack housing passage 279, screw jack housing groove 280, and screw jack coupling cavity 284. Since screw jack coupling cavity threading 287 is in cooperative mating and engagement with screw jack threading 273, the rotation of screw jack 262 causes screw jack coupling 264 to move away from female housing 230 towards the extended position 60. Furthermore, because the second end 282 of screw jack coupling 264 is fixedly attached to female plate 202, the rotation of screw jack 262 also causes female plate 202 to move away from female housing 230 towards the extended position 60.

As female plate 202 moves from the retracted position 50 to the extended position 60, each horizontal guide sleeve 370 moves toward male plate 102 and begins to slide on its corresponding alignment post 385. Eventually, alignment post first end 386 slides out of the second end 372 of its corresponding horizontal guide sleeve 370.

As previously disclosed, once means for vertically aligning 400 properly aligns female assembly 200 and male assembly 100 in the vertical direction, each horizontal guide post 114 on male plate 102 is substantially axially aligned with its corresponding horizontal guide sleeve 370. Thus, as female plate 202 moves closer to male plate 102, the first end 371 of the horizontal guide sleeve 370 is eventually adjacent to the first end 115 of its corresponding horizontal guide post 114. Further axial movement towards male plate 102 causes each horizontal guide post 114 to enter horizontal guide sleeve cavity 373 through horizontal guide sleeve first end 371. The first taper 20 of horizontal guide sleeve cavity 373 aids in the insertion of the corresponding horizontal guide post 114. The body 119 of each horizontal guide post 114 then slides within its corresponding horizontal guide sleeve cavity 373.

In the preferred embodiment, each corresponding horizontal guide post 114, horizontal guide sleeve 370, and alignment post 385 are sized and shaped so that before alignment post first end 386 slides out of the second end 372 of its horizontal guide sleeve 370, horizontal guide post 114 enters horizontal guide sleeve cavity 373 through its corresponding horizontal guide sleeve first end 371.

The relative cross-sectional diameters of horizontal guide post 114 and horizontal guide sleeve 370 ensure that, once a significant portion of horizontal guide post 114 is within horizontal guide sleeve 370, female assembly 200 is secured on male assembly 100 in the horizontal direction. Thus, means for horizontally aligning 500 properly aligns female assembly 200 to male assembly 100 in the horizontal direction.

Once means for vertically aligning 400 and means for horizontally aligning 500 have aligned the assemblies, 100 and 200, in both the vertical and horizontal directions, female assembly 200 is then secured to and is properly and precisely aligned with male assembly 100.

As previously disclosed, the pattern in which the plurality of female plate openings 35 is arranged on female plate 202 is identical in shape, size, and configuration to the pattern of arrangement of the plurality of male plate openings 20 on male plate 102. The location of the plurality of female plate openings 35 in relation to female plate 202 and the location of the plurality of male plate openings 20 in relation to male plate 102 must be such that, once means for vertically aligning 400 has properly aligned the assemblies, 100 and 200, in the vertical direction and once means for horizontally aligning 500 has properly aligned the assemblies, 100 and 200, in the horizontal direction, each female plate opening 35 is precisely axially aligned with its corresponding male plate opening 20. In turn, once each female plate opening 35 is precisely axially aligned with its corresponding male plate opening 20, each female connecting element 37 is precisely axially aligned with its corresponding male connecting element 22.

It is noted that, although the male connecting elements 22 and the female connecting elements 37 are substantially axially aligned after means for vertically aligning 400 has aligned the assemblies, 100 and 200, in the vertical direction, precise axial alignment is required in order to effectuate a correct and clean engagement between each male connecting element 22 and its corresponding female connecting element 37. Such precise axial alignment is necessary to prevent costly and time consuming engagement failure, such as the jamming of connecting elements. Further, such precise axial alignment is only achieved once means for horizontally aligning 500 has aligned female assembly 200 and male assembly 100 in the horizontal direction thereby fully securing female assembly 200 to male assembly 100.

Means for functionally engaging 258 next compels the continued extension of female plate 202. Eventually, as female plate 202 moves further towards male plate 102, each male connecting element 22 engages its corresponding female connecting element 37. Once each male connecting element 22 is fully engaged with its corresponding female connecting element 37, means for extending 260 may be deactivated. At this point, female assembly 200 is substantially in the extended position 60. Means for extending 260 is deactivated by terminating the rotation of the key on key slot 277.

It is noted that as female plate 202 moves into its extended position 60, means for attaching screw jack coupling 266, specifically screw jack coupling nut 294 and end cap 295, enters and extends into the axially aligned male plate access hole 401. Such an axially aligned mechanism allows for the safe and proper coupling of the male and female connecting elements, 22 and 37.

Furthermore, it is noted that pad 124, which is attached to male plate first surface 104, preferably abuts female plate first surface 204 after each male connecting element 22 is fully engaged with its corresponding female connecting element 37. The frame created by pad 124 around the plurality of male plate openings 20 and horizontal guide posts 114 substantially eliminates the ocean current therein. Thus, pad 124 serves to inhibit the accidental disengagement caused or exacerbated by ocean currents of the connecting elements, 22 and 37.

Female assembly 200 is shaped and constructed so that it may be transported from the ocean surface to the location of the male assembly 100 by an ROV. In this application, the ROV also transports the relevant key and engages means for extending 260 by inserting it within key slot 277. It is understood that the operation disclosed herein may be performed by an ROV due to the simplicity of each step. In order to perform the operation, an ROV need simply to deposit female assembly 200 onto vertical guide posts 180, insert the key into key slot 277, and activate engagement means 260 by turning the key until the connecting elements, 22 and 37, are fully and properly coupled.

If an operator wishes to do so, female assembly 20 may be disengaged from male assembly 100. Disengagement is performed by inserting the key in key slot 277 and turning the key in the counter-clockwise direction thereby activating means for extending 260. Activation of means for extending 260 in the opposite direction causes female plate 202 to move from its extended position 60 to its retracted position 50.

As female plate 202 moves from its extended position 60 to its retracted position 50, each female connecting element 37 moves away and disengages from its corresponding male connecting element 22. As female plate continues to move from its extended position 60 to its retracted position 50, each horizontal guide sleeve 370 moves toward female housing 230 and begins to slide on its corresponding horizontal guide post 114. Eventually, horizontal guide post first end 115 slides out of the horizontal guide sleeve first end 371. Also eventually, and preferably concurrently, the first end 386 of the corresponding alignment post 385 re-enters horizontal guide sleeve cavity 373 through horizontal guide sleeve second end 372. The second taper 21 of horizontal guide sleeve cavity 373 aids in the insertion of the corresponding alignment post 385 and allows small discrepancies in the axial alignment of horizontal guide sleeve 370 and alignment post 385. Further axial movement towards female housing 230 causes means for extending 260 to reach its retracted position 50.

Once female plate 202 reaches its retracted position 50, female assembly 200 can be lifted from vertical guide posts 180 and male assembly 100. Female assembly 200 is then ready to be transported back to the ocean surface.

In the embodiment in which vertical guide posts 180 are attached to support plate 130 by way of means for attaching vertical guide post 184 and in the event that female assembly 200 cannot be disengaged from male assembly 100 due to a means for extending 260 malfunction, or it cannot be lifted from and is stuck to vertical guide posts 180, an operator may remove the vertical guide posts 180 together with the female assembly 200. In order to do so, vertical guide post nuts 188 are removed thereby allowing the vertical guide posts 180 and the female assembly 200 to be lifted together. In another embodiment, support plate 130 also comprises a support plate slot 13 extending from each vertical guide post hole 184 towards and through support plate second end 140. Each support plate slot 13 also extends from support plate first surface 132 towards and through support plate second surface 134. Thus, to remove vertical guide posts 180 and female assembly 200, vertical guide post nuts 188 need only be loosened (but may also be removed). Subsequently, vertical guide posts 180 together with female assembly 200 are slid out of abutment with male assembly 100 though support plate slots 13. In this embodiment, if an operator requires a new connection and the vertical guide posts 180 have already been removed, an operator may utilize a new, properly functioning female assembly 200 to connect to the male assembly 100 with the aid of means for horizontally aligning 500. Such a connection procedure, one in which the means for vertically aligning 400 is not used, is known in the art and usually requires that horizontal guide posts 114 include grooves (not shown) thereon. Such grooves may be included on the horizontal alignment posts 114 as used in this invention. The use of the means for horizontally aligning 500 (without the means for vertically aligning 400) will provide sufficient enablement for the proper alignment of male assembly 100 and female assembly 200. However, in this case and without the use of the means for vertically aligning 400, the proper alignment of the male and female assemblies, 100 and 200, will depend to a great extent on the maneuvering and precision of the ROV.

Furthermore, if a problem occurs while initially placing female assembly 200 onto vertical guide posts 180 or while engagement means 260 is activated, an operator has several contingency options. If the operator believes that the malfunction is in the female assembly 200, the malfunctioning female assembly 200 may be removed from the male assembly 100 and transported back to the ocean surface. A new, properly functioning female assembly 200 may then be transported to the underwater location and be correctly connected to the male assembly 100. If for some reason the female assembly 200 cannot be lifted from and is stuck to the vertical guide posts 180, then an operator may remove the female assembly 200 together with the vertical guide posts 180 by the methods previously disclosed.

Functionally operating assembly 10 as described herein comprises a method for use in an underwater environment for connecting a first set to a second set of electric or hydraulic lines. As disclosed herein, the method generally comprises:

(1) fixedly positioning male assembly 100 in the underwater environment with male assembly 100 including the plurality of male connecting elements 22 in functional communication with the first set of lines;

(2) transporting female assembly 200 from the surface of the underwater environment to the male assembly 100 with female assembly 200 including the plurality of female connecting elements 37 in functional communication with the second set of lines;

(3) vertically aligning the plurality of female connecting elements 37 with the plurality of male connecting elements 22;

(4) horizontally aligning the plurality of female connecting elements 37 with the plurality of male connecting elements 22; and (5) functionally engaging the plurality of male connecting elements 22 to the vertically and horizontally aligned plurality of female connecting elements 37 wherein said first and second set of lines are connected upon the functional engagement of the female and male connecting elements, 37 and 22.

In the preferred embodiment, the vertically aligning step comprises lowering the female assembly 200 onto the male assembly 100, with the male assembly 100 including the at least one vertical guide post 180 extending therefrom and the female assembly 200 including the corresponding vertical guide sleeve 380 for each at least one vertical guide post 180, so that each at least one vertical guide post 180 is inserted in its corresponding vertical guide sleeve 380.

In the preferred embodiment, the horizontally aligning step comprises extending the female assembly 200 towards the male assembly 100, with the male assembly 100 including the at least one horizontal guide post 114 extending therefrom and the female assembly 200 including the corresponding horizontal guide sleeve 370 for each at least one horizontal guide post 114, so that each at least one horizontal guide post 114 is inserted in its corresponding horizontal guide sleeve 370.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A connector assembly for use in an underwater environment for connecting a first and a second set of electric or hydraulic lines, comprising:

a male assembly including a plurality of male connecting elements in functional communication with said first set of lines;

said male assembly including a male plate;

each of said plurality of male connecting elements including an engagement end;

said engagement end of each of said plurality of male connecting elements protruding from said male plate;

a female assembly including a plurality of female connecting elements in functional communication with said second set of lines;

a means for vertically aligning said plurality of female connecting elements with said plurality of male connecting elements;

a means for horizontally aligning said plurality of female connecting elements with said plurality of male connecting elements;

a means for functionally engaging said plurality of female connecting elements to said vertically and horizontally aligned plurality of male connecting elements; and wherein said first and second set of lines are connected upon said functional engagement of said female and male connecting elements.

2. An assembly as in claim 1, wherein said means for vertically aligning comprising:

said male assembly including at least one vertical guide post extending therefrom;

said female assembly including a corresponding vertical guide sleeve for each of said at least one vertical guide post;

each of said vertical guide sleeve sized and constructed to receive its said corresponding vertical guide post therein; and said plurality of male connecting elements being vertically aligned with said plurality of female connecting elements when each of said at least one vertical guide post is inserted in its said corresponding vertical guide sleeve.

3. An assembly as in claim 2, wherein said means for horizontally aligning comprising:

said male assembly including at least one horizontal guide post extending therefrom;

said female assembly including a corresponding horizontal guide sleeve for each of said at least one horizontal guide post;

each of said horizontal guide sleeve sized and constructed to receive its said corresponding horizontal guide post therein; and said plurality of male connecting elements being horizontally aligned with said plurality of female connecting elements when each of said at least one horizontal guide post is inserted in its said corresponding horizontal guide sleeve.

4. An assembly as in claim 3, wherein said means for horizontally aligning further comprising a means for extending said female assembly towards said male assembly to enable the insertion of each of said at least one horizontal guide post into its said corresponding horizontal guide sleeve.

5. An assembly as in claim 4, wherein:

said male assembly including a support plate;

said female assembly including a female plate and a female housing;

said at least one vertical guide post extending from said support plate;

said at least one horizontal guide post extending from said male plate;

said corresponding vertical guide sleeve disposed in said female housing;

said corresponding horizontal guide sleeve disposed in said female plate; and said means for extending extending said female plate towards said male plate.

6. An assembly as in claim 5, wherein said means for extending comprising:

said female housing including a screw jack rotatably attached thereto;

said female plate including a screw jack coupling fixedly attached thereto;

said screw jack threadably engaged with said screw jack coupling so that rotation of said screw jack in one direction extends said female plate away from said female housing and towards said male plate and so that rotation of said screw jack in the other direction retracts said female plate away from said male plate and towards said female housing;

said means for extending defining an extended position in which said female plate is extended a distance away from said female housing; and said means for extending defining a retracted position in which said female plate is retracted towards said female housing.

7. An assembly as in claim 6, wherein said means for horizontally aligning further comprising:

said female housing including a corresponding alignment post for each of said horizontal guide sleeve;

each of said horizontal guide sleeve sized and constructed to receive its said corresponding alignment post therein; and each of said horizontal guide sleeve receiving its said corresponding alignment post when said means for extending is in said retracted position.

8. An assembly as in claim 7, wherein each of said horizontal guide sleeve receiving its said corresponding alignment post and its said horizontal guide post as said means for extending is between said retracted position and said extended position.

9. An assembly as in claim 6, wherein each of said horizontal guide sleeve receiving its said corresponding horizontal guide post when said means for extending is in said extended position.

10. An assembly as in claim 8, wherein:

said means for functionally engaging comprising said means for extending when said means for extending moves into and is in said extended position; and said extended position further defined by said female plate being extended towards said male plate so that said plurality of female connecting elements come into functional engagement with said plurality of male connecting elements.

11. An assembly as in claim 1, wherein said means for horizontally aligning comprising:

said male assembly including at least one horizontal guide post extending therefrom;

said female assembly including a corresponding horizontal guide sleeve for each of said at least one horizontal guide post;

each of said horizontal guide sleeve sized and constructed to receive its said corresponding horizontal guide post therein; and said plurality of male connecting elements being horizontally aligned with said plurality of female connecting elements when each of said at least one horizontal guide post is inserted in its said corresponding horizontal guide sleeve.

12. An assembly as in claim 11, wherein said means for horizontally aligning further comprising a means for extending said female assembly towards said male assembly to enable the insertion of each of said at least one horizontal guide post into its said corresponding horizontal guide sleeve.

13. As assembly as in claim 1, wherein:

said male assembly is fixedly positioned in said underwater environment; and said female assembly is transported from the surface of said underwater environment to said male assembly.

14. An assembly as in claim 13, wherein said female assembly, said means for horizontally aligning, and said means for vertically aligning are remotely controlled from the surface of said underwater environment.

15. A connector assembly for use in an underwater environment for connecting a first set to a second set of electric or hydraulic lines, comprising:

a male assembly including a plurality of male connecting elements in functional communication with said first set of lines;

said male assembly including a male plate;

each of said plurality of male connecting elements including an engagement end;

said engagement end of each of said plurality of male connecting elements protruding from said male plate;

a female assembly including a female plate;

said female plate including a plurality of female connecting elements in functional communication with said second set of lines;

a means for extending said female plate towards said male plate to functionally engage said plurality of female connecting elements to said plurality of male connecting elements; and wherein said first and second set of lines are connected upon said functional engagement of said female and male connecting elements.

16. An assembly as in claim 15, further comprising a means for vertically aligning said plurality of male connecting elements with said plurality of female connecting elements prior to said functional engagement.

17. An assembly as in claim 15, further comprising a means for horizontally aligning said plurality of male connecting elements with said plurality of female connecting elements prior to said functional engagement.

18. A method for use in an underwater environment for connecting a first set to a second set of electric or hydraulic lines, comprising:

fixedly positioning a male assembly in said underwater environment, said male assembly including a plurality of male connecting elements in functional communication with said first set of lines, said male assembly including a male plate, each of said plurality of male connecting elements including an engagement end, and said engagement end of each of said plurality of male connecting elements protruding from said male plate;

transporting a female assembly from the surface of said underwater environment to said male assembly, said female assembly including a plurality of female connecting elements in functional communication with said second set of lines;

vertically aligning said plurality of female connecting elements with said plurality of male connecting elements;

horizontally aligning said plurality of female connecting elements with said plurality of male connecting elements; and functionally engaging said plurality of male connecting elements to said vertically and horizontally aligned plurality of female connecting elements wherein said first and second set of lines are connected upon said functional engagement of said female and male connecting elements.

19. A method as in claim 18, wherein said vertically aligning step comprises:

lowering said female assembly onto said male assembly, said male assembly including at least one vertical guide post extending therefrom and said female assembly including a corresponding vertical guide sleeve for each of said at least one vertical guide post;

so that each of said at least one vertical guide post is inserted in its said corresponding vertical guide sleeve.

20. A method as in claim 19, wherein said horizontally aligning step comprises:

extending said female assembly towards said male assembly, said male assembly including at least one horizontal guide post extending therefrom and said female assembly including a corresponding horizontal guide sleeve for each of said at least one horizontal guide post;

so that each of said at least one horizontal guide post is inserted in its said corresponding horizontal guide sleeve.

* * * * *